(12) United States Patent
Sammons et al.

(10) Patent No.: US 6,866,697 B2
(45) Date of Patent: Mar. 15, 2005

(54) POROUS GAS PERMEABLE MATERIAL FOR GAS SEPARATION

(75) Inventors: Jack Sammons, Louisville, KY (US); David M. Goddard, Louisville, KY (US)

(73) Assignee: Gas Separation Technology, Inc., Louisville, KY (US)

( * ) Notice: Subject to any disclaimer, the term of this patent is extended or adjusted under 35 U.S.C. 154(b) by 0 days.

(21) Appl. No.: 10/429,959

(22) Filed: May 6, 2003

(65) Prior Publication Data

US 2004/0035290 A1 Feb. 26, 2004

Related U.S. Application Data

(63) Continuation of application No. 10/177,138, filed on Jun. 24, 2002, now Pat. No. 6,558,455, which is a continuation of application No. 09/590,377, filed on Jun. 9, 2000, now Pat. No. 6,425,936.
(60) Provisional application No. 60/138,581, filed on Jun. 11, 1999.

(51) Int. Cl.$^7$ .............................................. B01D 53/22

(52) U.S. Cl. ........................ 95/45; 95/52; 95/54; 96/4; 55/524; 55/DIG. 5

(58) Field of Search ................................ 95/45, 47–55; 96/4, 7–14; 55/524, DIG. 5

(56) References Cited

U.S. PATENT DOCUMENTS

| | | | | |
|---|---|---|---|---|
| 4,261,832 A | * | 4/1981 | Schumacher et al. .. | 210/500.27 |
| 5,310,414 A | * | 5/1994 | Najjar et al. .................... | 95/45 |
| 5,342,431 A | * | 8/1994 | Anderson et al. .............. | 95/45 |
| 5,429,743 A | * | 7/1995 | Geus et al. ................. | 210/490 |
| 5,453,413 A | * | 9/1995 | Eklund ....................... | 502/416 |
| 5,710,187 A | * | 1/1998 | Steckle et al. ................. | 521/64 |
| 5,716,527 A | * | 2/1998 | Deckman et al. ........... | 210/651 |
| 5,772,735 A | * | 6/1998 | Sehgal et al. ................... | 95/45 |
| 5,851,395 A | * | 12/1998 | Kawase et al. ........ | 210/500.27 |
| 5,871,650 A | * | 2/1999 | Lai et al. ..................... | 210/653 |
| 5,935,440 A | * | 8/1999 | Bratton et al. .............. | 210/500 |
| 6,001,251 A | * | 12/1999 | Asher et al. ........... | 210/500.22 |
| 6,074,457 A | * | 6/2000 | Anthonis et al. .............. | 95/45 |
| 6,090,289 A | * | 7/2000 | Verduijn et al. ............ | 210/644 |
| 6,193,784 B1 | * | 2/2001 | Yazawa et al. ................. | 95/45 |
| 6,425,936 B1 | * | 7/2002 | Sammons et al. ............. | 95/45 |
| 6,558,455 B2 | * | 5/2003 | Sammons et al. ............... | 96/4 |

FOREIGN PATENT DOCUMENTS

| | | | |
|---|---|---|---|
| EP | 0967237 | * | 12/1999 |
| WO | WO 93/11861 | * | 6/1993 |
| WO | WO 95/27556 | * | 10/1995 |
| WO | WO 98/30318 | * | 7/1998 |
| WO | WO 98/41566 | * | 9/1998 |

OTHER PUBLICATIONS

Japanese Abstract–59059222 published Apr. 5, 1984.*
Dr. Shawn Phillips; "Nanostructured Chemicals Workshop"; Nonostructured Chemicals Workshop, Huntington Beach, Californi Sep. 7–8, 2000.*
Dr. Joseph D. Lichtenban; "The Commercialization of Nonostructured Chemicals"; Nonostructured Chemicals Workshop, Huntington Beach, California Sep. 7–8, 2000.*
Hank Malasky; "Poss Market Response and Trends"; Nonostructured Chemicals Workshop, Huntington Beach California Sep. 7–8, 2000.*
Dr. Gregory R. Gillette; "Engineering Thremoplastics Perspectives for the 21st century"; Nanostructured Chemicals Workshop, Huntington Beach, California Sep. 7–8, 2000.*
Joseph J. Schwab; "Poss Nanostructured Chemicals; Providing Utility Through Diversity"; Nanostructured Chemicals Worksho Huntington Beach, California Sep. 7–8, 2000.*
Bill Reinerth; "Poss for Surface Modification and Corrosion Prevention"; Nanostructured Chemicals Workshop, Huntington Beach, California Sep. 7–8, 2000.*
Dr. Shawn H. Phillips; "Hybrid Poss–Polymer Technology for Rockets & Space Applications"; Nanostructured Chemicals Workshop; Huntington Beach, California Sep. 7–8, 2000.*
Jeffery W. Gilman; "NIST/BRFL Perspectives on Poss Technology"; Nanostructured Chemicals Workshop; Huntington Beach, California Sep. 7–8, 2000.*
Rusty L. Blanski et al.; "Poss Lubricants and Blends"; Nanostructured Chemicals Workshop; Huntington Beach, California Sep. 7–8. 2000.*
Frank J. Feher et al., "Poss Monomer and Reagent Chemistry"; Nanostructured Chemicals Workshop; Huntington Beach, California Sep. 7–8, 2000.*
Barry L. Farmer; "Molecular Simulations of Poss–Substituted Polynorbornene"; Nanostructured Chemicals Workshop; Huntington Beach, California Sep. 7–8, 2000.*
Andre Lee; "Thermomechanical Properties of Poss–Polymer Hybrids"; Nanostructured Chemicals Workshop; Huntington Beach California Sep. 7–8, 2000.*

(List continued on next page.)

*Primary Examiner*—Robert H. Spitzer
(74) *Attorney, Agent, or Firm*—Harness, Dickey & Pierce, .PLC

(57) ABSTRACT

A method of separating a mixture of N (N≧2) gases by size exclusion, comprising:
contacting the mixture of gases with N–1 gas permeable porous films, each of the N–1 gas permeable porous films being made of a permeable porous material including pores of different sizes, formed with at least one nanostructured compound. wherein the at least one nanostructured compound includes 30% or more polyhedral oligomeric silsequioxane (POSS) by weight: wherein at least one of the N–1 gas permeable porous films has pores which do not allow permeation of at least one of the N gases.

3 Claims, 9 Drawing Sheets

OTHER PUBLICATIONS

Patrick T. Mather et al.; "Processing and Materials Science of Poss hybrid Polymers"; Nanostructured Chemicals Workshop; Huntington Beach, California Sep. 7–8, 2000.*

Benjamin S. Hsiao; "Molecular Enhancement by Addition of Poss–Case Studies of Poss–PU and Poss–IPP"; Nanostructured Chemicals Workshop; Huntington Beach, California Sep. 7–8, 2000.*

Gar B. Hoflund; "Development of a Hyperthermal Oxygen Atom Generator and Erosion Resistant Spacecraft Material"; Nanostructured Chemicals Workshop; Huntington Beach, California Sep. 7–8, 2000.*

R. M. Laine et al.; "Organic/Inorganic Nanocomposites with Completely Defined Interfacial Interactions from Cubic Silsesquioxane"; Nanostructured Chemicals Workshop; Huntington Beach, California Sep. 7–8, 2000; pp. 1–42.*

Scott Schricker et al.; "Poss Modified Dental Restoratives"; Nanostructured Chemicals Workshop; Huntington Beach, California Sep. 7–8, 2000.*

E. Bryan Coughlin; "Poss–Polyolefin Copolymers"; Nanostructured Chemicals Workshop; Huntington Beach California Sep. 7–8, 2000.*

* cited by examiner

● = Silicon

◉ = Oxygen

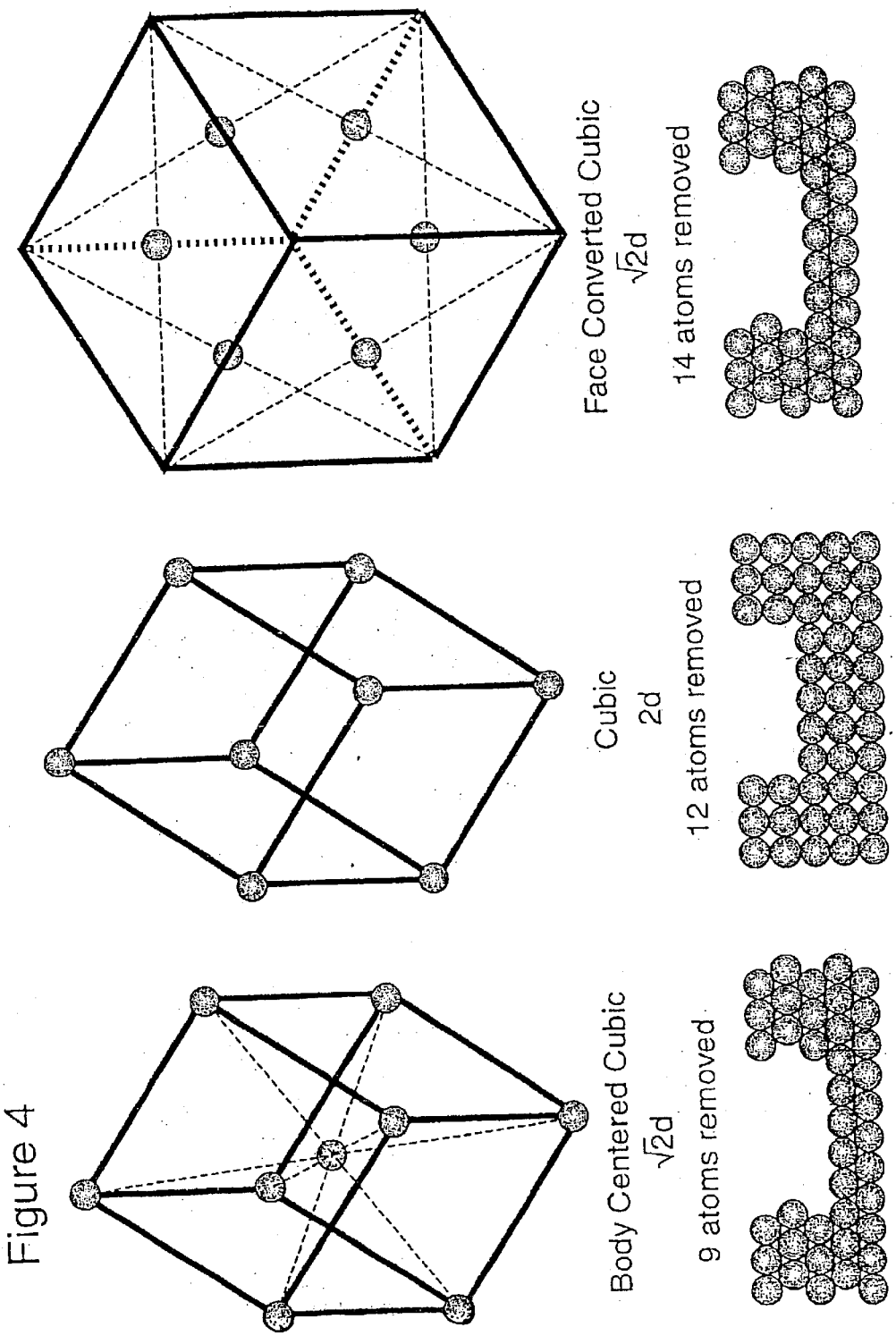

Figure 5   Multi-layered Laser Etched Gold Substrait At 3.7 Å°
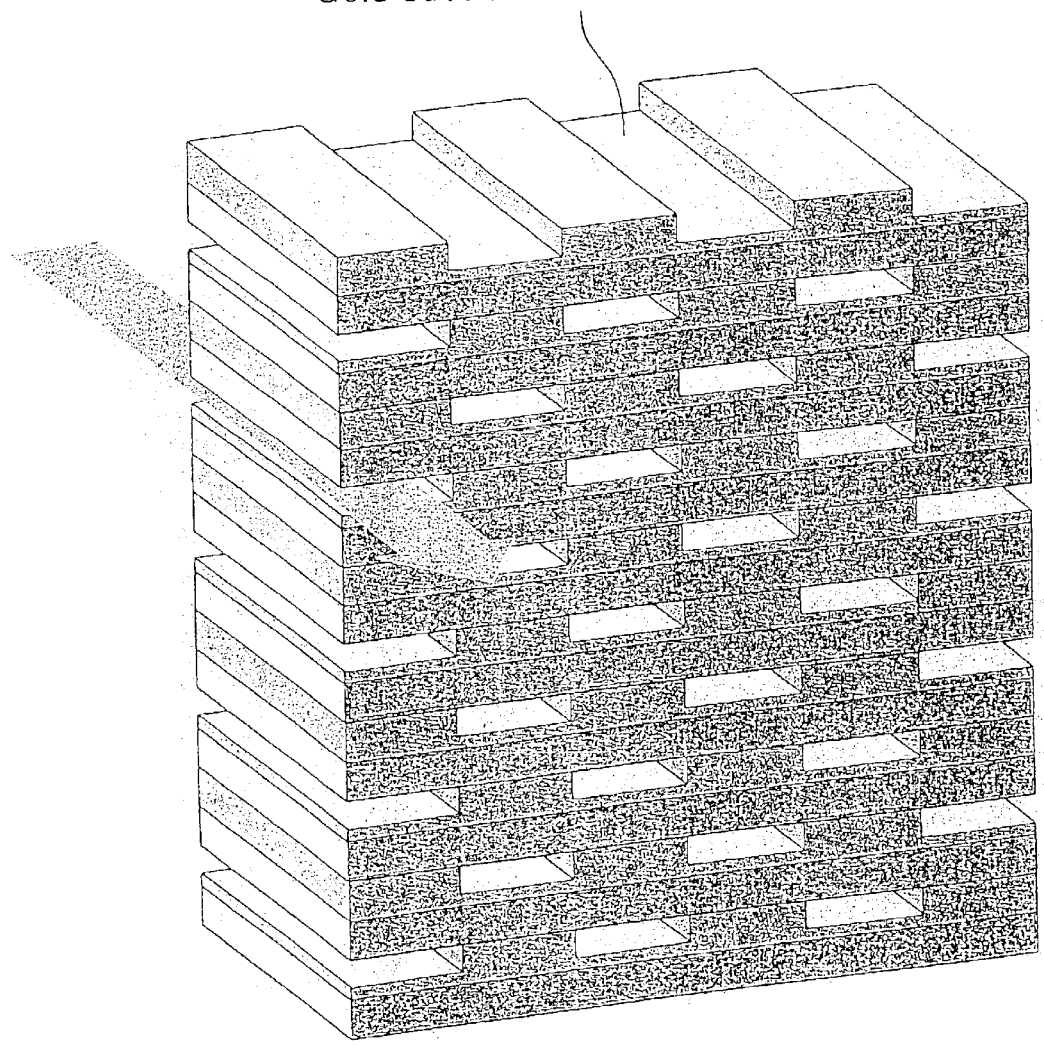
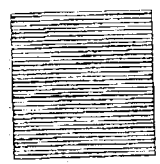 Side view of the length of slots (white)
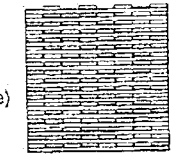 View into the end of the openings (white)

Non Compressed

Compressed

POROUS GAS PERMEABLE MATERIAL FOR GAS SEPARATION

This application is a continuation of U.S. application Ser. No. 10/177,138 filed on Jun. 24, 2002 (now U.S. Pat. No. 6,558,455) which is a continuation of U.S. application Ser. No. 09/590,377 filed on Jun. 9, 2000 (now U.S. Pat. No. 6,425,936), the entire contents of which are hereby incorporated by reference and for which priority is claimed under 35 U.S.C. § 120; and which claims priority of U.S. Provisional Application No. 60/138,581 filed in the U.S. on Jun. 11, 1999 under 35 U.S.C. § 119.

BACKGROUND OF THE INVENTION

1. Field of the Invention

The present invention relates to a gas separator for gas separation, a method for preparing the gas separator, and a method of performing gas separation.

2. Description of the Related Art

It has been determined that there are limits to the compressibility of gas molecules, a fact which is commonly known as the law of incompressibility of matter. Based on this law, it has further been found that gas molecules behave as if they have some minimum diameter, known as their "working diameter".

If it is desired to separate one species of gas from others, for any one of many reasons (e.g., enhanced combustion, gas recovery, pollution control, etc.), it has been realized for some time that the ideal separation mechanism would pass one gaseous component in a mixture, while rejecting all others in a continuous steady-state manner. Organic membrane materials allow the passage of only certain molecules, but this passage is typically controlled by a solution diffusion mechanism, which is too slow (partition coefficients allow flows of 2–3 l/ft$^2$/day which are insufficient) a process for this approach to be used in many industrial gas separation applications. Other approaches have created "molecular sieves" that capture molecules based on their size or other physical or chemical properties. Such "sieves" are not truly sieves at all in the customary sense of the term, because no molecules pass through them. Rather, the trapped molecules must be "cleaned out" of these devices periodically by changes in temperature or pressure.

Previous methods to circumvent these drawbacks by the use of porous inorganic structures have focused on producing a porous material with holes in the size range of gas molecules. However, these methods have never attempted to create holes of a specific size, and for the specific purpose of separating two or more well-defined gases. Furthermore, there has been nothing in previous approaches that included the steps of first, selecting the hole size desired, and second, creating a porous material containing this hole size.

SUMMARY OF THE INVENTION

It is an object of this invention to provide a process for producing gas separation membranes having high selectivity achieved by having controlled pore sizes and narrow pore size distributions, and high permeance, defined as flux/pressure drop, achieved by having a large volume fraction porosity and a very thin selective layer.

It is yet another object of this invention to provide a process for producing gas separators using cage-like molecules to form pores. Since the size and concentration of the cage-like molecules are under the complete control of the Experimenter, the pore size and distribution of the gas separator can be tailored to separate virtually any mixture of gases in an efficient manner.

Working diameters of selected gas molecules are shown in Table 1. If the goal is, for example, to separate oxygen from nitrogen, one would need to create a porous structure, or true molecular sieve, containing holes greater than 3.5 Å, but less than 3.6 Å, in diameter. More correctly, the gas separator would require that one dimension of its holes be between these two numbers; the maximum dimension of the holes could be appreciably larger, because a gas molecule with a working diameter of 3.6 Å, such as nitrogen, could not fit through any hole whose smaller dimension was smaller than this value. The ability to select hole sizes within a gas separator is a feature of this invention.

BRIEF DESCRIPTION OF THE DRAWINGS

FIG. 4 illustrates examples of channels in three different crystal forms;

FIG. 5 illustrates a rolled thin film containing channels;

DETAILED DESCRIPTION OF THE PREFERRED EMBODIMENTS

Figure 1:
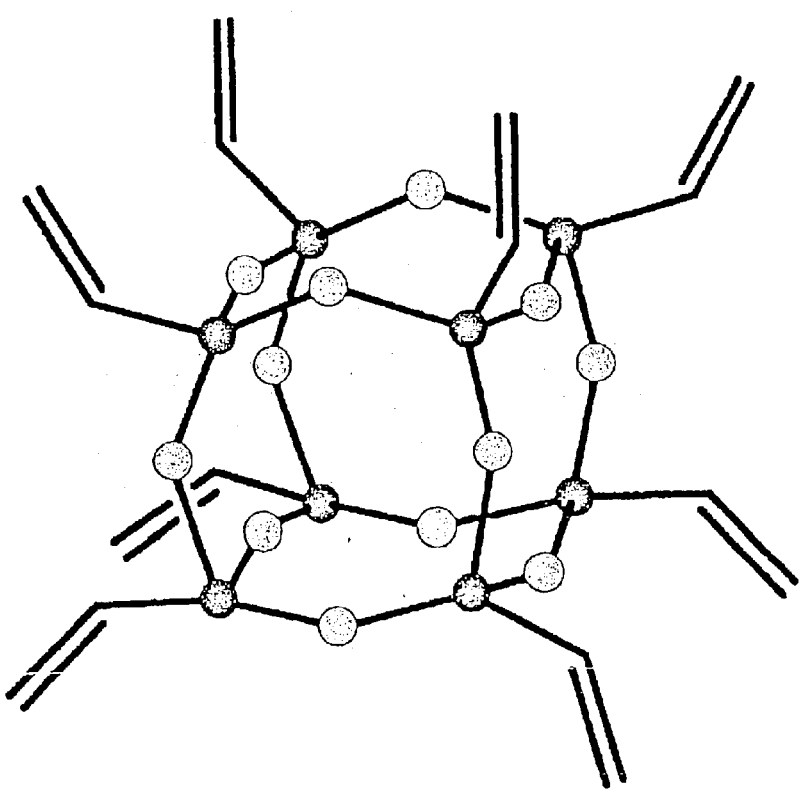
FIG. 1 illustrates a vinyl POSS monomer.

The present invention, in part, is drawn to a permeable porous material for separating a mixture of gases by selectable pore size exclusion, comprising pores formed with at least one nanostructured compound. In other words, the inventive porous material can be used to separate a mixture of gases based upon the different working diameter of each of the gases. By selecting specific nanostructured compounds, the porous material can be tailored to contain pores of a predetermined size which allow gases having a working diameter smaller than the size of the pores to pass through the material while preventing the passage of gases having a working diameter greater than the size of the pores.

The nanostructured compound is optionally substituted with a reactive group and is selected from the group consisting of a polyhedral oligomeric silsequioxane (POSS), zeolite, cyclomacroether, porphyrin, foldamer, cyclodextrin and mixtures thereof. Possible reactive substituents include alcohol, alkoxysilane, amine, chlorosilane, epoxide, ester, halide, methacrylate, molecular silica, nitrile, norbornene, olefin, phosphine, silane, silanol, styrene, and mixtures thereof. The reactive substituent may be bonded directly to the nanostructured compound or may be bonded through an organic, siloxane or organosiloxane group.

It is preferred that the nanostructured compound is a POSS derivative having a cage composed of silicon and oxygen, and having a molecular formula of:

wherein n is 4–36, 48 or 60, and R is a reactive substituent defined above which may be bonded directly to the silicon atoms forming the cage. Preferably n is 8, 10, 12 and/or 14. A description of possible cages is taught by Wichmann et al (Wichmann, D. et al. J. Phys. Chem. B, Vol. 103, pp. 10087–10091, 1999), which is incorporated herein by reference. Each of the cages taught by Wichmann et al can be further modified by attaching reactive substituents to the cage atoms.

Examples of POSS compounds include:

1-[3-(allylbisphenol A)propyldimethylsiloxy]-3,5,7,9,11,13, 15heptacyclopentylpentacyclo-[9.5.1.13,9.15,15.17,13] octasiloxane;

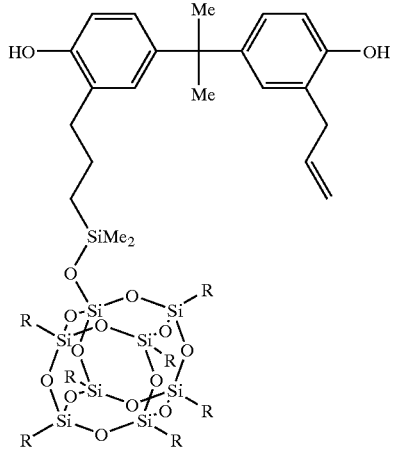

R = cyclopentyl

1-[3-(allylbiphenol)propyldimethylsiloxy]-3,5,7,9,11,13, 15heptacyclopentylpentacyclo-[9.5.1.13,9.15,15.17,13] octasiloxane;

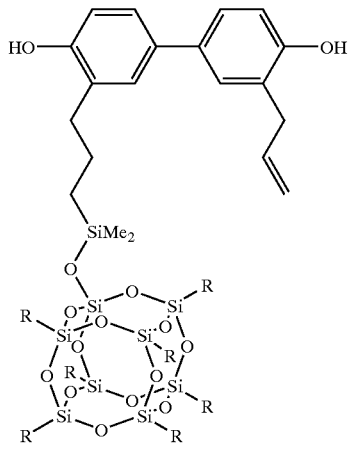

R = cyclopentyl

1-[3-(1,3-propanediol-2-ethyl-2-methyloxy)propyldimethylsiloxy]-3,5,7,9,11,13,15-heptacyclopentylpentacyclo-[9.5.1.13,9.15,15.17,13]octasiloxane;

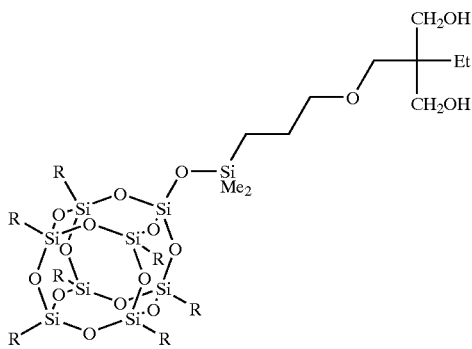

R = cyclopentyl

1-[(2-methyl,2-hydroxy)butyldimethylsiloxy]-3,5,7,9,11, 13,15-heptacyclopentylpentacyclo-[9.5.1.1$^{3,9}$.1$^{5,15}$.1$^{7,13}$] octasiloxane;

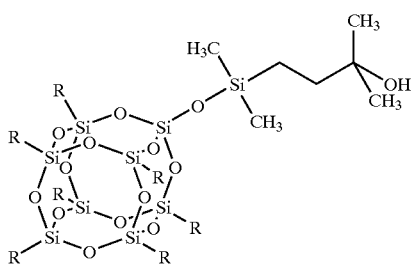

R = cyclopentyl

1-[3-(ethoxydimethylsilyl)propyl]3,5,7,9,11,13,15-heptacyclopentylpentacyclo[9.5.1.1$^{3,9}$,1$^{15,15}$,1$^{7,13}$] octasiloxane;

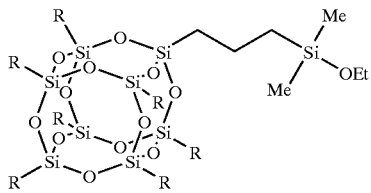

R = cyclopentyl

1-[2-(diethoxymethylsilyl)propyl]3,5,7,9,11,13,15-heptacyclopentylpentacyclo[9.5.1.1$^{3,9}$,1$^{15,15}$,1$^{7,13}$] octasiloxane:

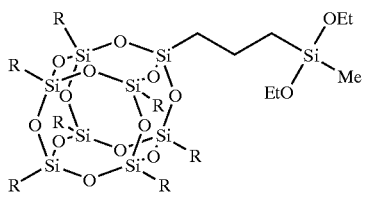

R = cyclopentyl

1-[3-(triethoxysilyl)propyl]3,5,7,9,11,13,15-heptacyclopentylpentacyclo [9.5.1.1$^{3,9}$, 1$^{15,15}$,1$^{7,13}$] octasiloxane;

1-[2-(diethoxymethylsilyl)propyl]3,5,7,9,11,13,15-heptacyclopentylpentacyclo[9.5.1.1$^{3,9}$,1$^{15,15}$,1$^{7,13}$] octasiloxane;

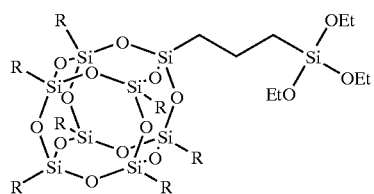

R = cyclopentyl

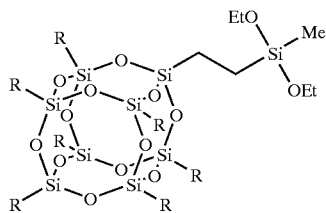

R = cyclopentyl

1-[2-(ethoxydimethylsilyl)ethyl]3,5,7,9,11,13,15-heptacyclopentylpentacyclo[9.5.1.1$^{3,9}$,1$^{15,15}$,1$^{7,13}$] octasiloxane;

1-[2-(triethoxysilyl)propyl]3,5,7,9,11,13,15-heptacyclopentylpentacyclo[9.5.1.1$^{3,9}$,1$^{15,15}$,1$^{7,13}$] octasiloxane;

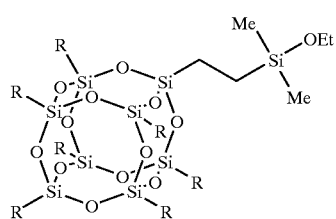

R = cyclopentyl

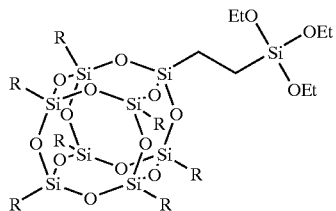

R = cyclopentyl

POSS-Bis Phenol A-urethanes;

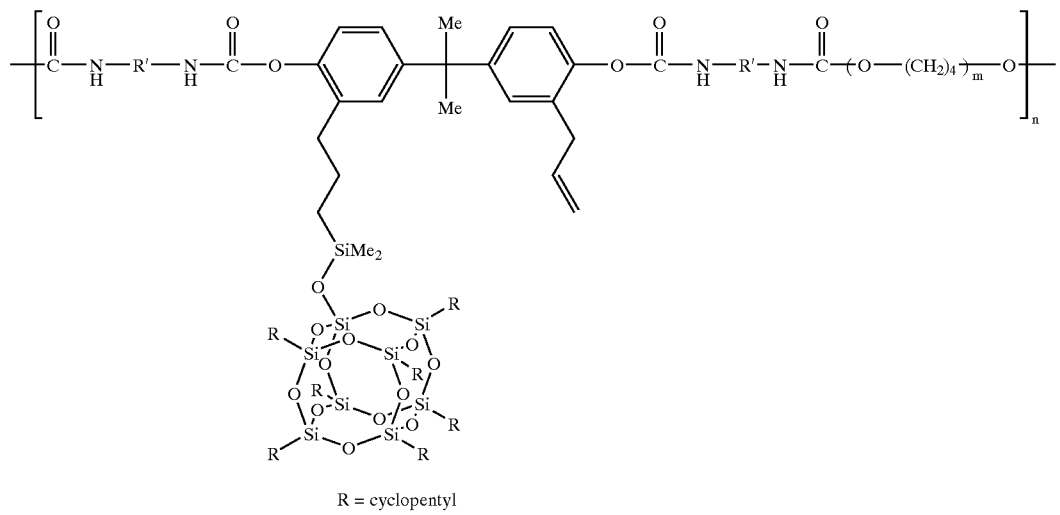

R = cyclopentyl

POSS-DiMethylol-urethanes;

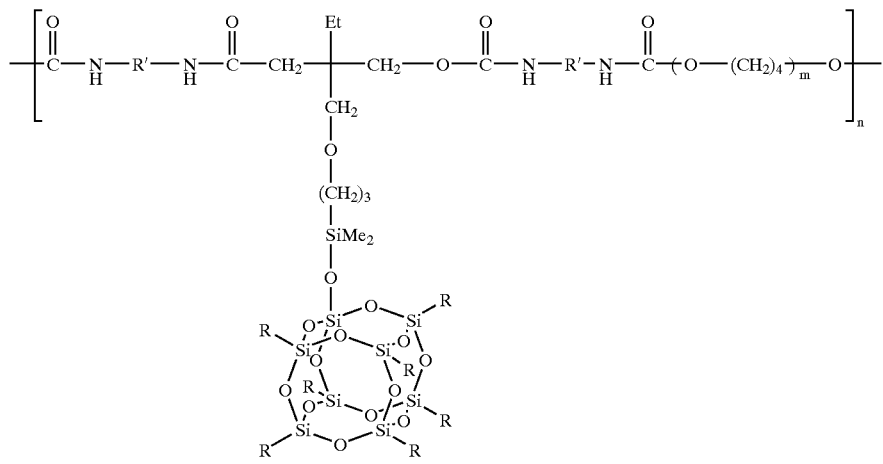

1-chloro-3,5,7,9,11,13,15-heptacyclopentylpentacyclo[9.5.1.1³,⁹.1⁵,¹⁵.1⁷,¹³]octasiloxane;

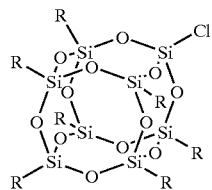

1-[2-(chlorodimethylsilyl)ethyl]-3,5,7,9,11,13,15heptacyclopentylpentacyclo[9.5.1.1.1³,⁹.1⁵,¹⁵.1⁷,¹³]octasiloxane;

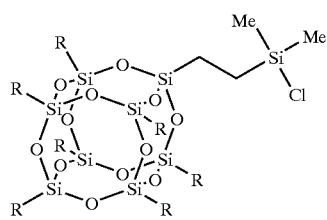

1-[2-(dichloromethylsilyl)ethyl]-3,5,7,9,11,13,15heptacyclopentylpentacyclo[9.5.1.1³,⁹.1⁵,¹⁵.1⁷,¹³]octasiloxane;

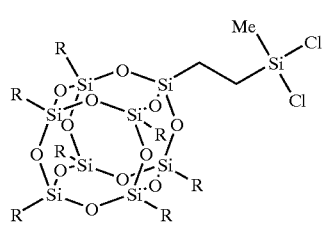

1-[2-(trichlorosilyl)ethyl]-3,5,7,9,11,13,15-heptacyclopentylpentacyclo[9.5.1.1³,⁹.1⁵,¹⁵.1⁷,¹³]octasiloxane;

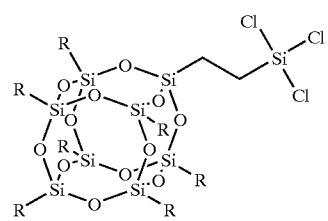

1-[3-(chlorodimethylsilyl)propyl]-3,5,7,9,11,13,15-heptacyclopentylpentacyclo[9.5.1.1³,⁹.1⁵,¹⁵.1⁷,¹³]-octasiloxane;

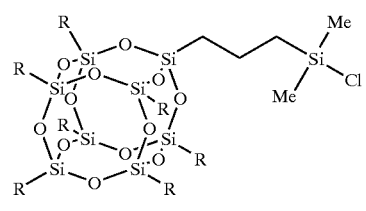

1-[3-(dichloromethylsilyl)propyl]-3,5,7,9,11,13,15-heptacyclopentylpentacyclo[9.5.1.1³,⁹,1⁵,¹⁵.1⁷,¹³]-octasiloxane;

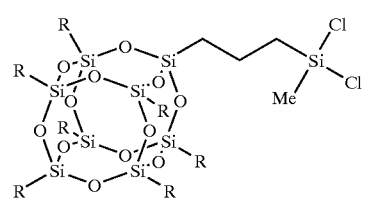

1-[3-(trichlorosilyl)propyl]-3,5,7,9,11,13,15-heptacyclopentylpentacyclo[9.5.1.1$^{3,9}$.1$^{5,15}$.1$^{7,13}$]octasiloxane;

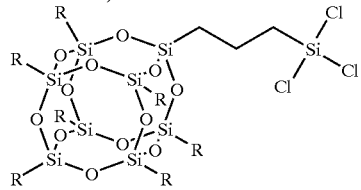

R = cyclopentyl 1,3,5,7,9,11,13,15-[2-(chlorodimethylsilyl)ethyl]pentacyclo[9.5.1.1$^{3,9}$.1$^{5,15}$.1$^{7,13}$]octasiloxane;

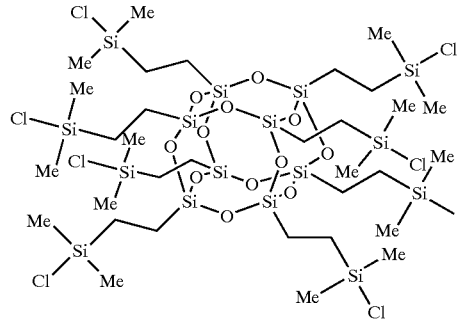

1,3,5,7,9,11,13,15-[2-(chlorodimethylsilyl)ethyl]pentacyclo[9.5.1.1$^{3,9}$.1$^{5,15}$.1$^{7,13}$]octasiloxane;

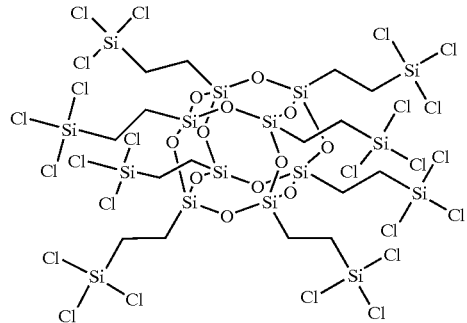

1,3,5,7,9,11,13,15-[2-(dichlorodimethylsilyl)ethyl]pentacyclo[9.5.5.1.1$^{3,9}$.1$^{5,15}$.1$^{7,13}$]octasiloxane;

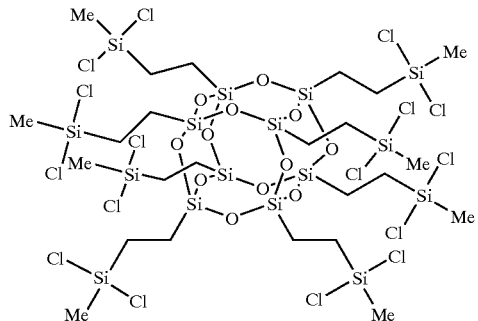

1-[(2-epoxy)propyl]-3,5,7,9,11,13,15-heptacyclopentylpentacyclo[9.5.1.13,9.15,15.17,13]octasiloxane;

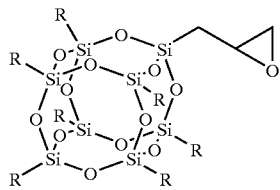

R = cyclopentyl

1-[2-(cyclohexyl-3-epoxy)ethyl]-3,5,7,9,11,13,15-heptacyclopentylpentacyclo[9.5.1.13,9.15,15.17,13]-octasiloxane;

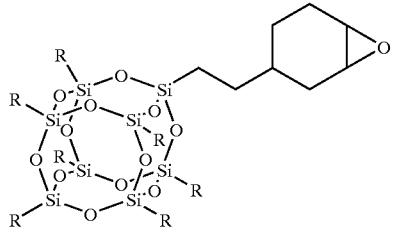

R = cyclopentyl

POSS-diepoxide resins;

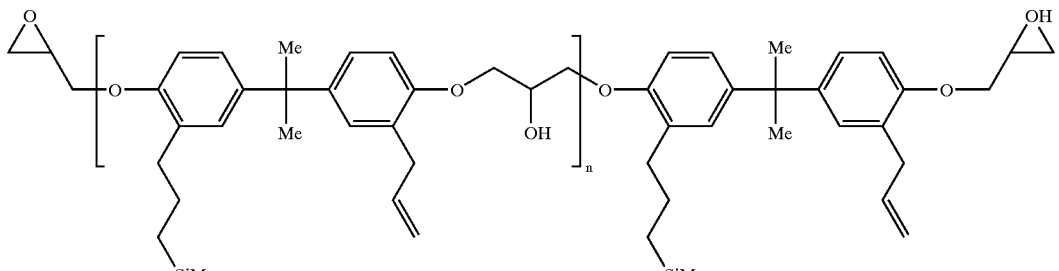

R = cyclopentyl 1,3,5,7,9-octavinyl-11,13,15-epoxyethylpentacyclo[9.5.1.1$^{3,9}$.1.$^{15,15}$.1.$^{17,13}$]octasiloxane;

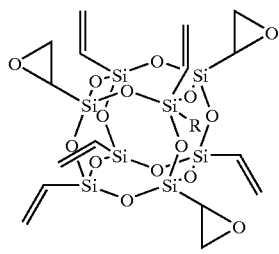

endo-3,7,14-tris[1-(3-dimethylsiloxy)propyloxy-2,3-epoxypropyl]-1,3,5,7,9,11,14,-heptacyclopentyltricyclo[7.3.3.1.$^{5,11}$]-heptasiloxane;

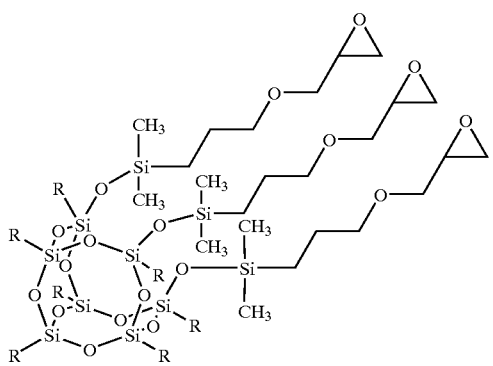

R = cyclopentyl 1-(methylpropionato)-3,5,7,9,11,13,15-heptacyclopentylpentacyclo[9.5.1.1$^{3,9}$.1$^{5,15}$.1$^{7,13}$]octasiloxane;

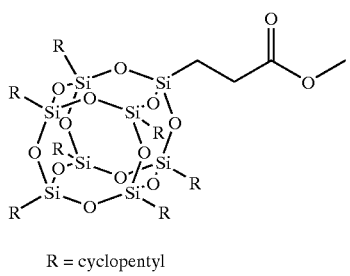

R = cyclopentyl 1-(ethylundecanoato)-3,5,7,9,11,13,15-heptacyclopentylpentacyclo[9.5.1.1$^{3,9}$.1$^{5,15}$.1$^{7,13}$]octasiloxane;

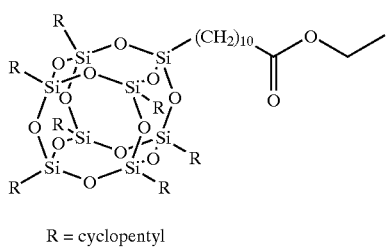

R = cyclopentyl

1-[(3-chloro)propyl]-3,5,7,9,11,13,15-heptacyclopentylpentacyclo[9.5.1.13,9.15,15.17,13]octasiloxane;

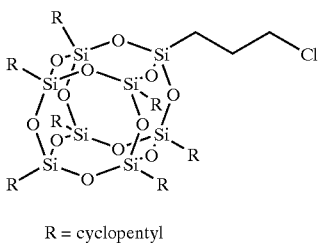

R = cyclopentyl

1-[4-chlorophenyl]-3,5,7,9,11,13,15-heptacyclopentylpentacyclo[9.5.1.13,9.15,15.17,13]octasiloxane;

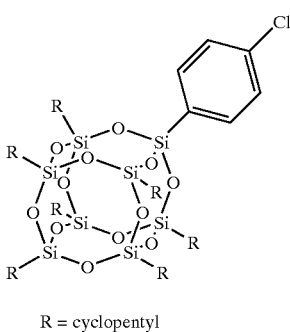

R = cyclopentyl

1-[chlorobenzyl]-3,5,7,9,11,13,15-heptacyclopentylpentacyclo[9.5.1.13,9.15,15.17,13]octasiloxane;

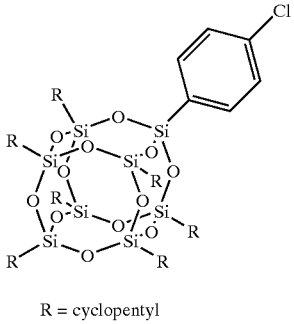

R = cyclopentyl

1-[2-(chlorobenzyl)ethyl]-3,5,7,9,11,13,15-heptacyclopentylpentacyclo[9.5.1.13,9.15,15.17,13]octasiloxane;

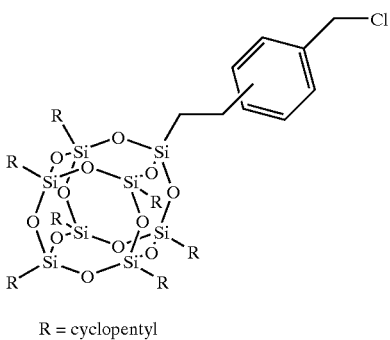

R = cyclopentyl

1-[3-(methacryl)propyl]-3,5,7,9,11,13,15-heptacyclopentylpentacyclo[9.5.1.13,9.15,15.17,13]octasiloxane;

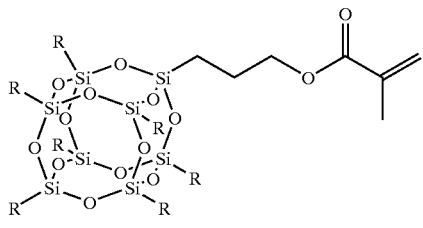

R = cyclopentyl

1-[3-(methacryl)propyldimethylsiloxy]-3,5,7,9,11,13,15-heptacyclopentylpentacyclo[9.5.1.13,9.15,15.17,13]-octasiloxane;

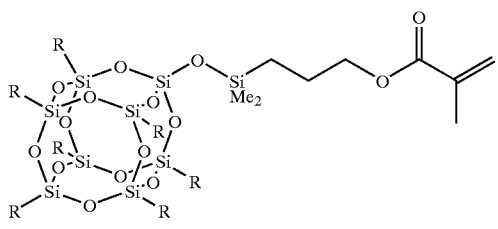

R = cyclopentyl 1-(3,3,3-trifluoropropyldimethylsiloxy)-1,3,5,9,11,13,15-heptacyclopentyl-7-[3-(methacryl)propyl]-7-methyltetracyclo[9.5.1.1$^{5,11}$.1$^{9,15}$]octasiloxane;

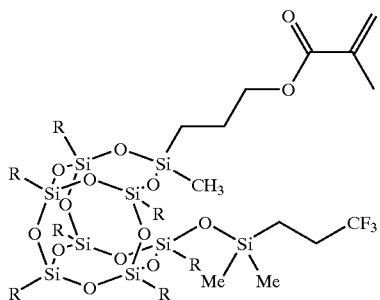

R = cyclopentyl 1-(tridecafluoro-1,1,2,2-tetrahydrooctyldimethylsiloxy)-1,3,5,9,11,13,15-heptacyclopentyl-7-[3-(methacryl)propyl]-7-methyltetracyclo[9.5.1.1$^{5,11}$.1$^{9,15}$]octasiloxane;

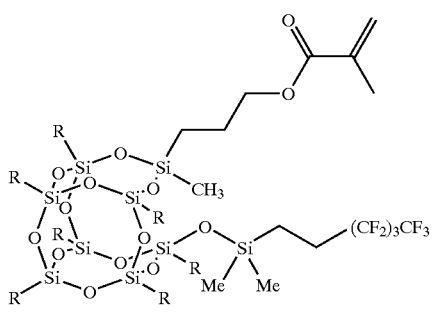

R = cyclopentyl 1-(trimethylsiloxy)-1,3,5,9,11,13,15-heptacyclopentyl-7-[3-(methacryl)propyl]-7-methyltetracyclo[9.5.1.1$^{5,11}$.1$^{9,15}$]octasiloxane;

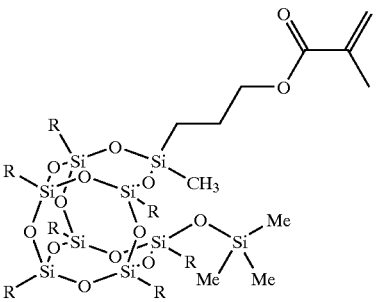

R = cyclopentyl 1,3,5,7,9-pentavinyl-11,13,15-[1-hydroxy-2-(methacryl)ethyl]pentacyclo[9.5.1.1$^{3,9}$.1$^{5,15}$.1$^{7,13}$]octasiloxane;

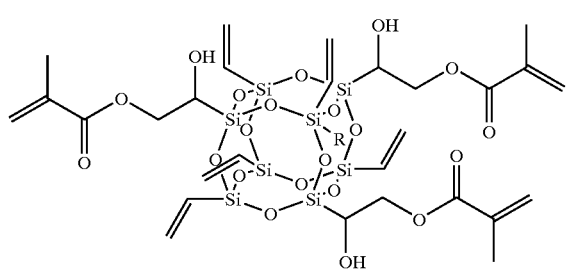

Average Structure Depicted 1,3,5,7,9,11-hexacyclohexyltetracyclo[5.5.1.13,11.15,9]hexasiloxane;

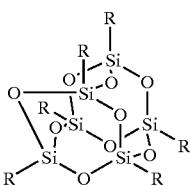

1,3,5,7,9,11,13,15-octacyclohexylpentacyclo[9.5.1.13,9.15,15.17,13]octasiloxane;

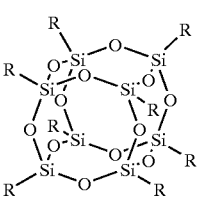

R = cyclohexyl 1,3,5,7,9,11,13,15-octacyclopentylpentacyclo[9.5.1.1<sup>3,9</sup>.1<sup>5,15</sup>.1<sup>7,13</sup>]octasiloxane;

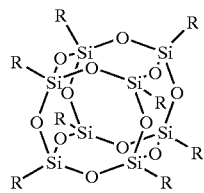

R = cyclopentyl 1,3,5,7,9,11,13,15-octaphenylpentayclo[9.5.1.1<sup>3,9</sup>.1<sup>5,15</sup>.1<sup>7,13</sup>]octasiloxane;

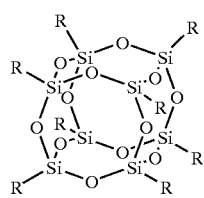

R = phenyl 1,3,5,7,9,11,13,15-octamethylpentayclo[9.5.1.1<sup>3,9</sup>.1<sup>5,15</sup>.1<sup>7,13</sup>]octasiloxane;

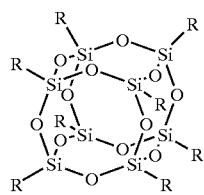

R = methyl 1,3,5,7,9,11,13,15-octakis(dimethylsilyloxy)pentacyclo[9.5.1.1<sup>3,9</sup>.1<sup>5,15</sup>.1<sup>7,13</sup>]octasiloxane;

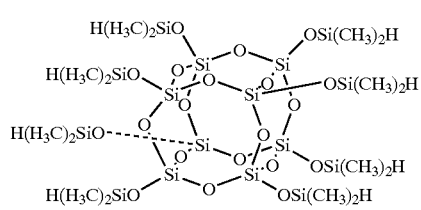

POSS-modified Nylon 6;

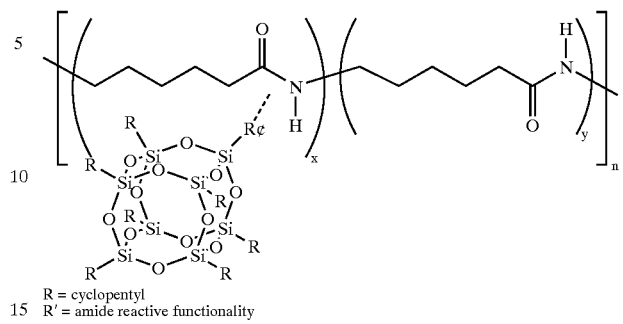

R = cyclopentyl
R' = amide reactive functionality

1-[(3-cyano)propyl]-3,5,7,9,11,13,15-heptacyclopentylpentacyclo[9.5.1.1<sup>3,9</sup>.1<sup>5,15</sup>.1<sup>7,13</sup>]octasiloxane;

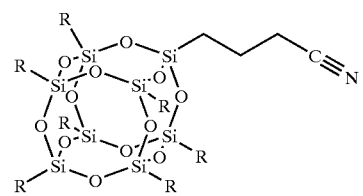

R = cyclopentyl

1-[2-Norbornen-2-yl)ethyl]-3,5,7,9,11,13,15-heptacyclopentylpentacyclo[9.5.1.1<sup>3,9</sup>.1<sup>5,15</sup>.1<sup>7,13</sup>]octasiloxane;

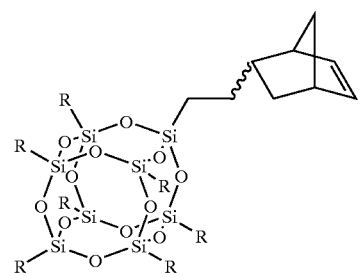

R = cyclopentyl

1-[2-(Norbornen-2-yl)ethyldimethylsilyloxy]-3,5,7,9,11,13,15heptacyclopentylpentacyclo[9.5.1.1<sup>3,9</sup>.1<sup>5,15</sup>.1<sup>7,13</sup>]-octasiloxane;

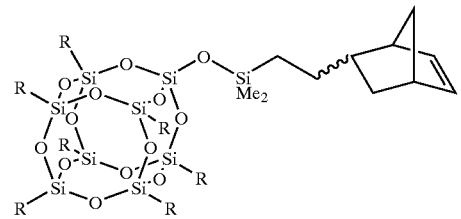

R = cyclopentyl

Poly(ethylnorbornenylPOSS-co-norbornene);

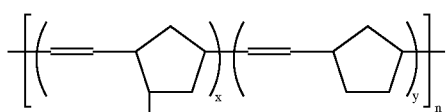

R = cyclopentyl 1,1,3,3-(Norbornenyldimethylsiloxy)-1,3,-dicyclohexyldisiloxane;

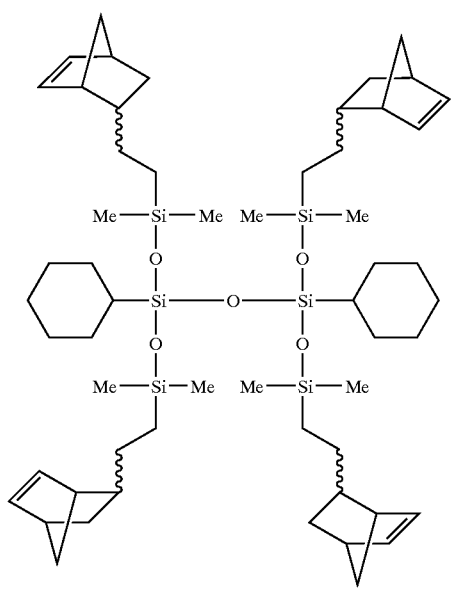

1-[3-(allylbisphenol A)propyldimethylsiloxy]-3,5,7,9,11,13,15heptacyclopentylpentacyclo-[9.5.1.13,9.15,15.17,13]octasiloxane;

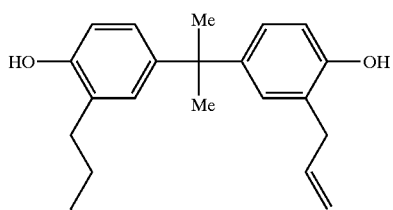

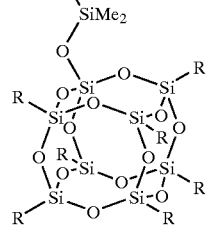

R = cyclopentyl

1-[3-(allylbiphenol)propyldimethylsiloxy]-3,5,7,9,11,13,15heptacyclopentylpentacyclo-[9.5.1.13,9.15,15.17,13]octasiloxane;

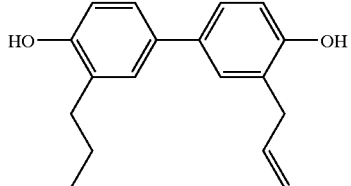

R = cyclopentyl 1,3,5,7,9,11,13,15-octavinylpentacyclo[9.5.1.13,9.15,15.17,13]octasiloxane;

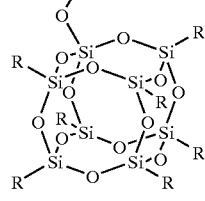

1-vinyl-3,5,7,9,11,13,15-heptacyclopentylpentacyclo[9.5.1.13,9.15,15.17,13]octasiloxane;

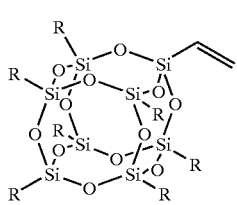

R = cyclopentyl 1-allyl-3,5,7,9,11,13,15-heptacyclopentylpentacyclo[9.5.1.1³,⁹.1⁵,¹⁵.1⁷,¹³]octasiloxane;
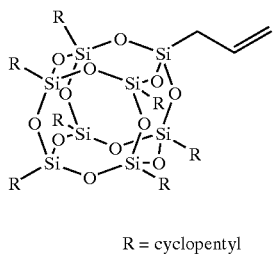
R = cyclopentyl
1-[2-(cyclohexen-3-yl)ethyl]-3,5,7,9,11,13,15-heptacyclopentylpentacyclo[9.5.1.1³,⁹.1⁵,¹⁵.1⁷,¹³]octasiloxane;
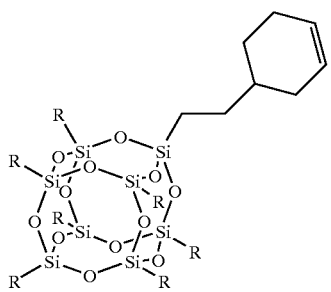
R = cyclopentyl
Poly(dimethyl-co-methylvinyl-co-methylethylsiloxyPOSS) siloxane;
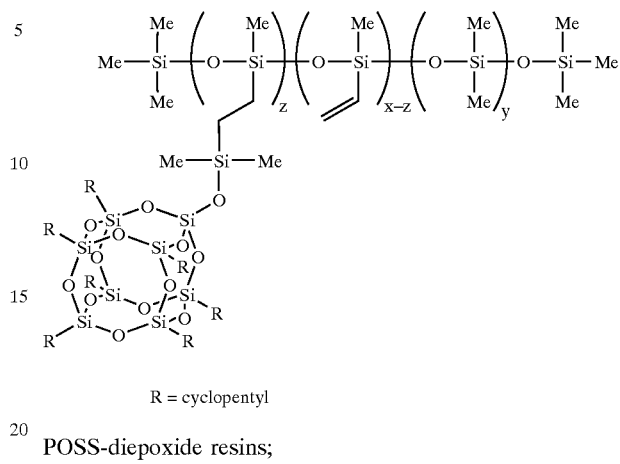
R = cyclopentyl
POSS-diepoxide resins;
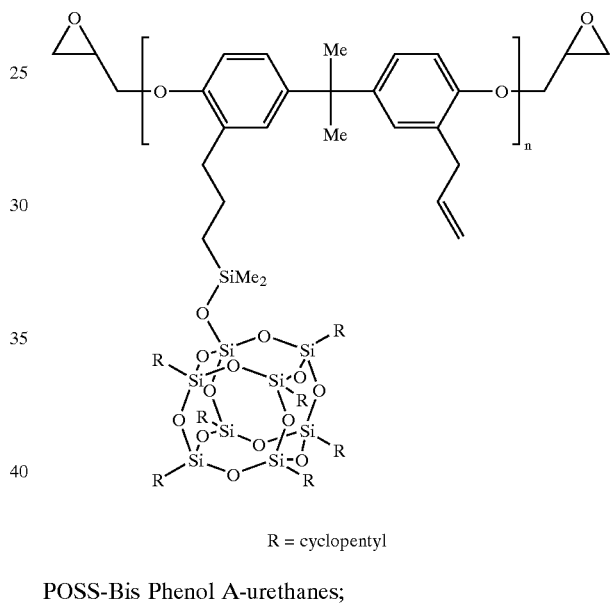
R = cyclopentyl
POSS-Bis Phenol A-urethanes;
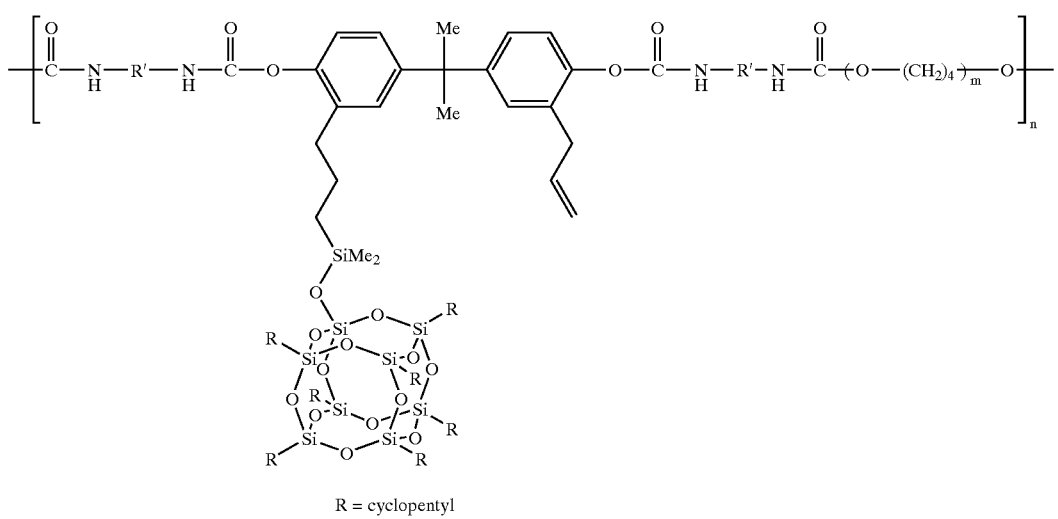
R = cyclopentyl 1-[2(diphenylphosphino)ethyl]3,5,7,9,11,13,15-heptacyclopentylpentacyclo[9.5.1.1$^{3,9}$.1$^{5,15}$.1$^{7,13}$]octasiloxane;

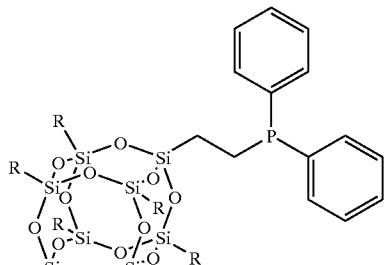

R = cyclopentyl

1-[2(diphenylphosphino)propyl]3,5,7,9,11,13,15-heptacyclopentylpentacyclo[9.5.1.1$^{3,9}$.1$^{5,15}$.1$^{7,13}$]octasiloxane;

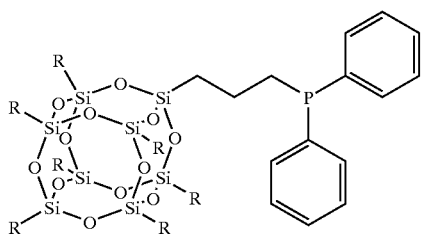

R = cyclopentyl 1-hydrido-3,5,7,9,11,13,15-heptacyclopentylpentacyclo[9.5.1.13,9.15,15.17,13]octasiloxane;

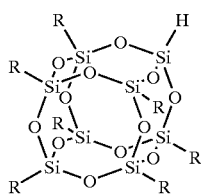

R = cyclopentyl

1-[hydridodimethylsiloxy]-3,5,7,9,11,13,15-heptacyclopentylpentacyclo[9.5.1.13,9.15,15.17,13]octasiloxane;

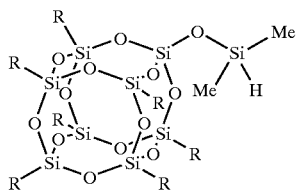

R = cyclopentyl endo-3,7,14-tri(dimethylsilylhydrido)-1,3,5,7,9,11,14-heptacyclopentyltricyclo[7.3.3.15,11]heptasiloxane;

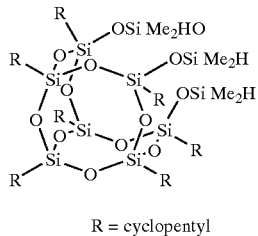

R = cyclopentyl 1,1,3,3-(hydridodimethylsiloxy)-1,3-dicyclohexyldisiloxane;

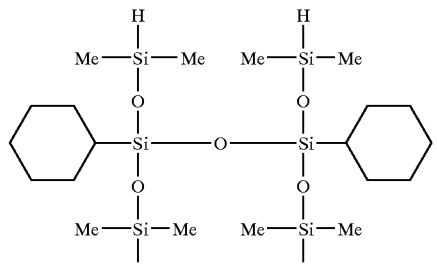

Poly(dimethyl-co-methylhydrido-co-methylpropylPOSS)siloxane;

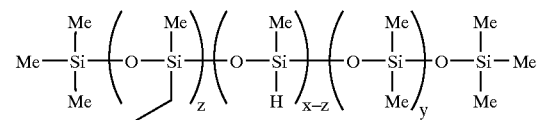
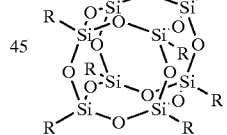

R = cyclopentyl endo-3,7,14-trihydroxy-1,3,5,7,9,11,14-heptacyclopentyltricyclo[7.3.3.15,11]heptasiloxane;

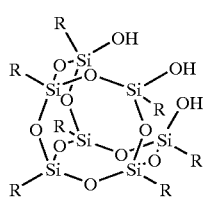

R = cyclopentyl endo-3,7,14-trihydroxy-1,3,5,7,9,11,14-heptacyclo-
hexyltricyclo[7.3.3.1⁵,¹¹]heptasiloxane;

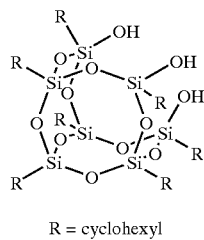

R = cyclohexyl 1-hydroxy-3,5,7,9,11,13,15-heptacyclopentylpentacyclo
[9.5.1.1³,⁹.1⁵,¹⁵.1⁷,¹³]octasiloxane;

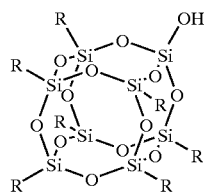

R = cyclopentyl 1,1,3,3-(tetrahydroxy)-1,3-dicyclohexyldisiloxane;

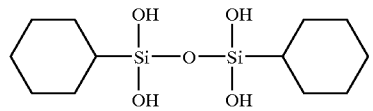

1,3,5,7-(tetrahydroxy)-1,3,5,7-(tetraphenyl)
cyclotetrasiloxane;

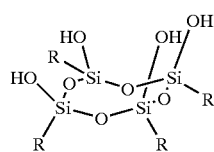

R = phenyl endo-7,14-dihydroxy-3-(3,3,3-trifluoropropyl-
dimethylsiloxy)-1,3,5,9,11,13,15-heptacyclopentyl-
tricyclo[7.3.3.1⁵,¹¹]octasiloxane;

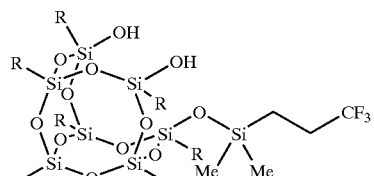

R = cyclopentyl endo-7,14-dihydroxy-3-(3,3,3-trifluoropropyldimethyl-
siloxy)-1,3,5,9,11,13,15-heptacyclopentyltricyclo
[7.3.3.1⁵,¹¹]octasiloxane;

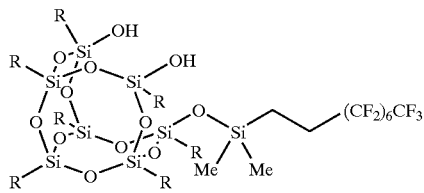

R = cyclopentyl

1-[2-(styryl)ethyldimethylsiloxy]-3,5,7,9,11,13,15-
heptacyclopentylpentacyclo[9.5.1.1³,⁹.1⁵,¹⁵.1⁷,¹³]-
octasiloxane;

R = cyclopentyl

1-[(4-vinyl)phenyl]-3,5,7,9,11,13,15-heptacyclopentyl-
pentacyclo[9.5.1.1³,⁹.1⁵,¹⁵.1⁷,¹³]octasiloxane;

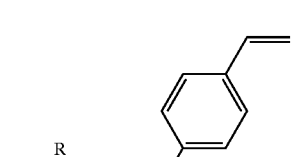

R = cyclopentyl

1-[2-(styryl)ethyl]-3,5,7,9,11,13,15-heptacyclopentyl-pentacyclo[9.5.1.13,9.15,15.17,13]-octasiloxane;

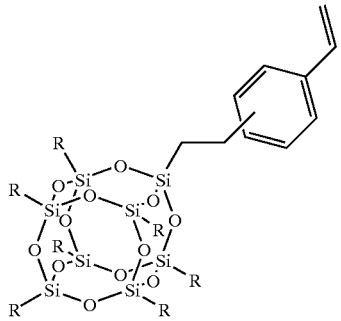

R = cyclopentyl

Poly(styrylPOSS-co-styrene);

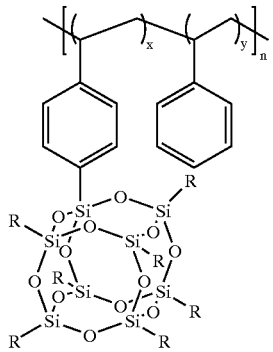

R = cyclopentyl poly(vinylsilsesquioxane);

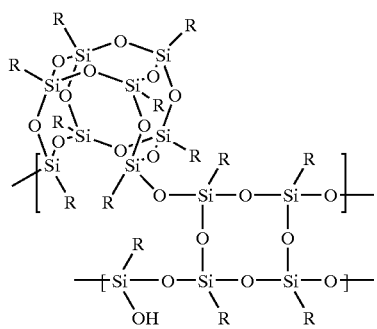

R = vinyl and structures having 10 and 12 silicon atoms in the cage, such as the following.

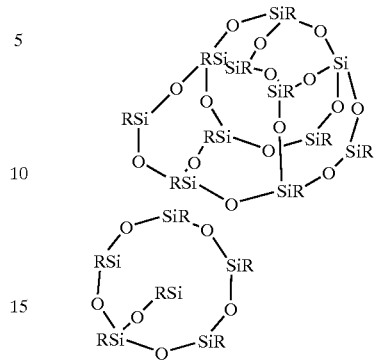

The nanostructured compound is preferably covalently bonded to a larger molecule, for example, as a pendant group on an organic or organosiloxane polymer. In addition or in the alternative, the nanostructured compound is a repeat unit in an oligomer or polymer. An example of oligomeric binding of the POSS is as follows:

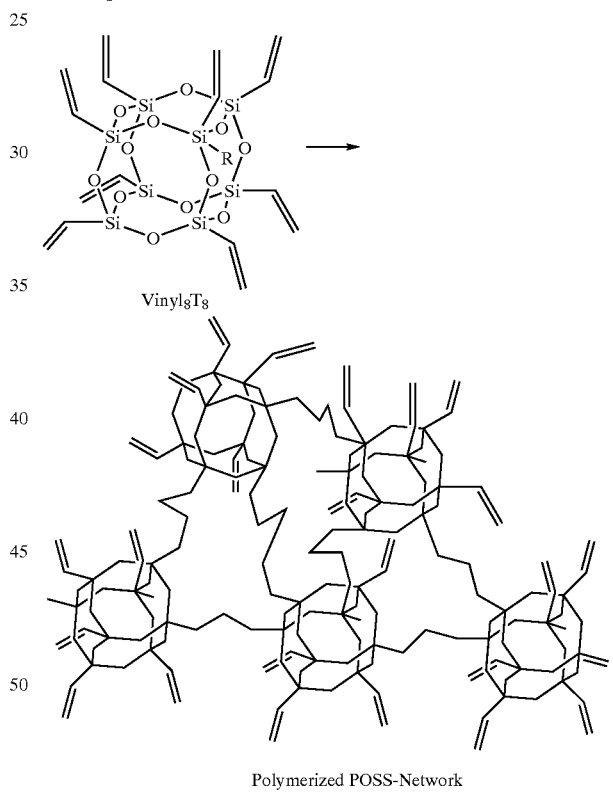

Vinyl$_8$T$_8$

Polymerized POSS-Network

The gas permeable porous material of the present invention preferably includes a film forming agent. The film forming agent is a blend of at least two different polymers or is a random or block copolymer of at least two different polymeric segments.

The film forming agent has at least one polymeric segment selected from the group consisting of polyvinyl, polycarbonate, polyurethane, poly(diorgano)siloxane, polysulfone, polyamide, poly(epoxide), polyepichlorohydrin, polyether, polyester, polyketone, and polyalkylene. Wherein the organo-group of the poly(diorgano)siloxane is selected from the group consisting of methyl, ethyl, n-propyl, isopropyl, n-butyl, iso-butyl, tert-butyl, pentyl, hexyl, cyclohexyl and phenyl; wherein the polyvinyl is selected from the group consisting of polyvinyl alcohol, poly(vinyl alcohol-co-ethylene), polyvinyl chloride, polyvinyl bromide, poly(vinyl acetate), poly(alkyl) acrylate, poly(alkyl)methacrylate, poly(acrylic acid) or salt thereof, polyacrylonitrile, polystyrene, poly(vinyl sulfonic acid) or salt thereof, and poly(vinyl methyl ketone); wherein the polyether is selected from the group consisting of poly(ethylene glycol), poly(propylene glycol), poly(ethylene terephthalate), poly(ethylene succinate), polyacetal, and polytetrahydrofuran; and wherein the polyalkylene is selected from the group consisting of polyethylene, polypropylene and polybutadiene. Also, wherein the alkyl group of the poly(alkyl)acrylate or poly(alkyl)methacrylate is selected from the group consisting of methyl, ethyl, n-propyl, isopropyl, butyl and 2-ethylhexyl.

The gas permeable porous material may be cured with heat or with a curing agent such as peroxide.

In the preparation of the gas permeable porous material, the nanostructured compound may be bonded through a reactive group to the film forming agent.

The gas permeable porous material has a pore concentration of $10^{15}$ to $10^{20}$ pores/m$^2$, preferably $10^{16}$ to $10^{18}$ pores/m$^2$.

The gas permeable porous material can be molded into any form to fit the design needs of the associated apparatus. Preferably the porous material is formed into a film.

The present invention, in part, is drawn to an apparatus for separating a mixture of gases by size exclusion, comprising a chamber made of a gas impermeable material, wherein the chamber has an opening sealed with a porous film formed of the gas permeable porous material of the present invention. The apparatus has n chambers in a series with n−1 porous films, wherein each chamber has at least one opening sealed with the porous film in communication with an opening in another chamber, and wherein n is a whole number greater than 1. Preferably, n is a whole number greater than 2 and the openings in the series of chambers are sealed with porous films having a decreasing average pore size.

For the separation of a mixture of oxygen and nitrogen, the minimum requirements are two chambers connected by a passage sealed with the inventive porous membrane tailored to have pores with a diameter of 3.55 Å. The mixture is charged into the first chamber. Due to the fact that the working diameter of oxygen is 3.46 Å and that of nitrogen is 3.64 Å, only oxygen will pass through the porous membrane into the second chamber.

A more complicated setup is required for the separation of a combustion gas containing oxygen, nitrogen, water and carbon dioxide. In a series of four chambers, the porous membrane between the first and second chamber has an average pore diameter of 3.55 Å, the porous membrane between the second and third chambers has an average pore diameter of 3.4 Å, and the porous membrane between the third and fourth chambers has an average pore diameter of 3.0 Å. In this setup, water will pass through to the fourth chamber for collection, carbon dioxide will be removed from the third chamber, oxygen from the second chamber and nitrogen is not able to pass through any of the membranes and will be collected from the first chamber.

The inventive method of separating a mixture of at least two gases could be applied to any mixture of gases wherein each gas has a different working diameter. The inventive porous material could be used to separate a mixture of gases flowing from an industrial exhaust. Ideally, the inventive porous material would isolate gases which are harmful to the environment from the industrial exhaust mixture of gases.

The preferred embodiment of the invention utilizes Polyhedral Oligomeric Silsesquioxane (POSS) materials, which

TABLE 1

Working Diameters of Gas Molecules

Figure 2:
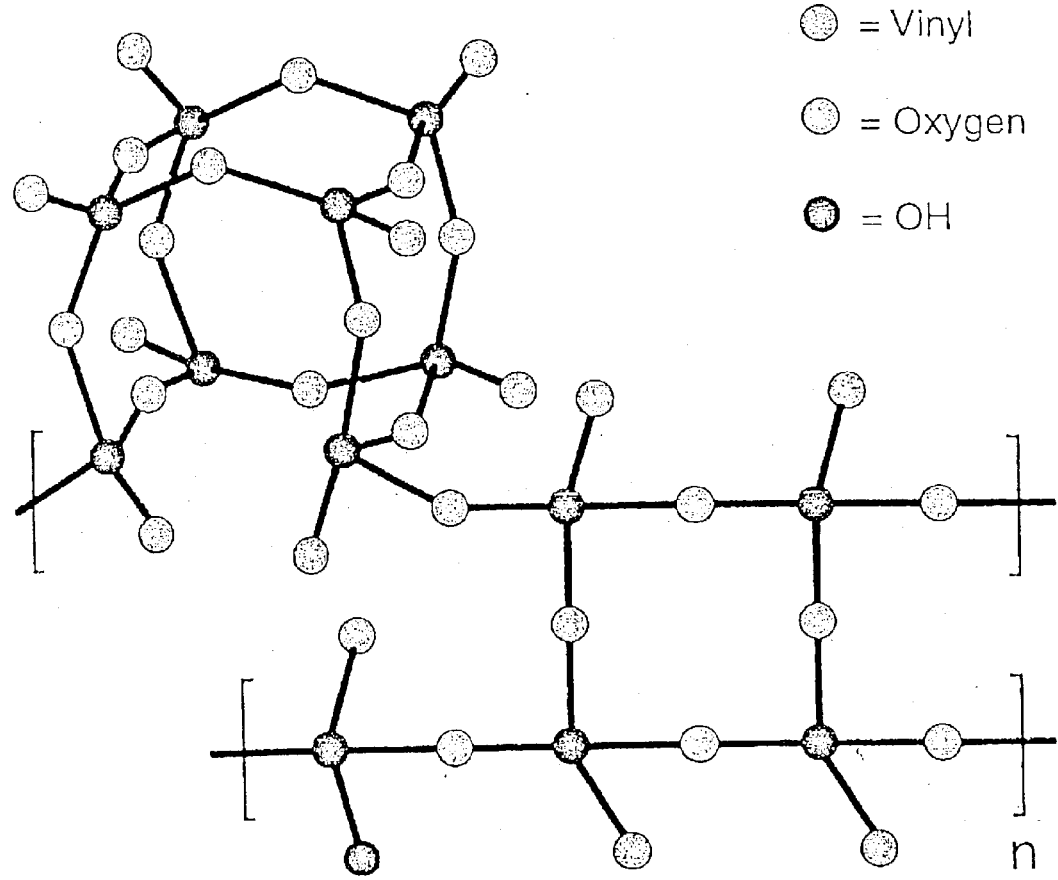
FIG. 2 illustrates a vinyl POSS prepolymer.

| Gas | Molecular Diameter (Angstroms) |
| --- | --- |
| Hydrogen | 2.89 |
| Helium | 2.6 |
| Oxygen | 3.46 |
| Nitrogen | 3.64 |
| Carbon Dioxide | 3.3 |
| Methane | 3.8 | are used to modify the molecular structures of monomers or polymers, such as polymethylmethacralate (PMMA). The POSS materials create a rigid "backbone" of inorganic material within the organic molecular structure of monomers and polymers, separating the organic components and actually creating a small hole in the organic material. FIG. 1 illustrates a molecular structure of unmodified POSS and FIG. 2 illustrates a molecular structure of partially polymerized POSS. The hole size illustrated in FIGS. 1 and 2 are on the order of Angstroms, which is precisely the size required for gas separation in a true molecular sieve. Furthermore, the hole size can be varied over an appreciable range, depending upon the combination of the specific POSS material and the monomer or polymer selected. If more selectivity or "fine tuning" of the hole sizes is required, the POSS materials can be used with organic materials that possess considerable elasticity. If such materials are stretched, the holes in the material become elongated in the direction of stretching, and become smaller in the direction normal to the stretching force. As explained previously, only one dimension of the hole needs to be within the desired limits. For example, a hole in a POSS-modified material may initially be round, with a diameter of 5.0 Å. By stretching the material, the holes can be transformed into ovals, with a length of perhaps 7.0 Å, but a height of 3.5 Å. A nitrogen molecule, with a diameter of 3.6 Å, could not fit through such a hole. For the described reasons of basic hole size tailorability, plus the modifying effect of stretching, the use of POSS-modified organics is an ideal method of "tailoring" the hole size for the specific gas separation desired.

Conventional methods depend on very complex physical and chemical theories, notably membrane laws by Fick, and solution-diffusion of gases in polymers. Zeolites used as molecular sieves require additional work, such as pressure swing, or temperature sieving manipulations to effect separation.

The main limiting factor is the size of the opening through which the gas needed to pass cannot be controlled or structured to eliminate that as a function of the so called permeation coefficient.

In response to this true molecular sieve concepts create a channel, pore, or hole, which are uniformly sized paths through a material which are sized according to the requirement of the gases chosen to separate.

If a simple mixture of oxygen and nitrogen are taken as an example, Table 1 shows oxygen is slightly smaller than nitrogen in its effective working diameter. Therefore, if paths are formed which are too small for nitrogen (3.64 Å) but larger than that of oxygen (3.46 Å), then oxygen can be separated from nitrogen.

In other systems such as membranes, the separation is a function of solution diffusion, and is therefore very slow. In molecular sieve zeolites, the system is charged, discharged and recharged, a cycle operation and must be given time to go through the cycle and requires more energy. A "true" molecular sieve is a near instantaneous process since the linear velocity of gas molecules is on the order of magnitude 600 meters per second, the time required to transit the pathway is on the order of magnitude of a fraction of a second, so the passage of continuous flow is established. If the number of pathways is large, the quantity of gas passing a unit area is larger than for organic membranes or zeolites.

Calculations for oxygen passage through a true molecular sieve having a five percent opening (paths) area show that a square meter of such a device would allow 3.46 Å—effective working diameter of oxygen-gas molecules to pass in ton quantities per day. Molecular sieve zeolite technology to produce such quantities would be a literal factory with tons of bed material. No other system would compare.

EXAMPLE 1

Oxygen having a working diameter of 3.46 Å (a pore diameter of 3.55 Å is used for ease of passage) has an area of $$A = \left(\frac{1}{2}D\right)^2 \pi$$

$$A_{pore} = \left(\frac{3.55A}{2}\right)^2 \pi = (1.77)^2 \pi = 9.84A$$

1 square meter $= 10^{10} \times 10^{10} \mathring{A}^2$ $$= 10^{20} \mathring{A}^2$$

5% open=$0.05 \times 10^{20}$ Å$^2$
number of pores is $$\frac{.05 \times 10^{20} A^2}{9.90 \; A^2} = 5.05 \times 10^{17}$$

(1.77 Å produces an $A_{pore}$=9.84 Å whereas 1.78 Å produces an $A_{pore}$=9.95 Å, so an average of 9.90 Å is used)
Time of passage taken as $1 \times 10^{-6}$ sec; then $$\frac{5.05 \times 10^{17}}{1 \times 10^{-6}} = 5.05 \times 10^{23}$$

molecules per second
$5.05 \times 10^{23}$ molecules of oxygen per second
One mole of oxygen is 32 grams. Avagadro's number is $6.02 \times 10^{23}$
Therefore:

$$\frac{5.05 \times 10^{23}}{6.02 \times 10^{23}} \times 32 = 0.83 \; mole \times 32 \; g/mole = 26.6 \; g/sec.$$

Per day: 0.83 mole/sec of oxygen gives since
24 hours is 84,600 sec
this is:

.83 mole/sec × 84,600 sec =

70,218 moles × 32 g/mole = (71,903,232 g/day/m$^2$)

(158,203 lbs./day/m$^2$)

(79.1 tons/day/m$^2$)

Figure 3:
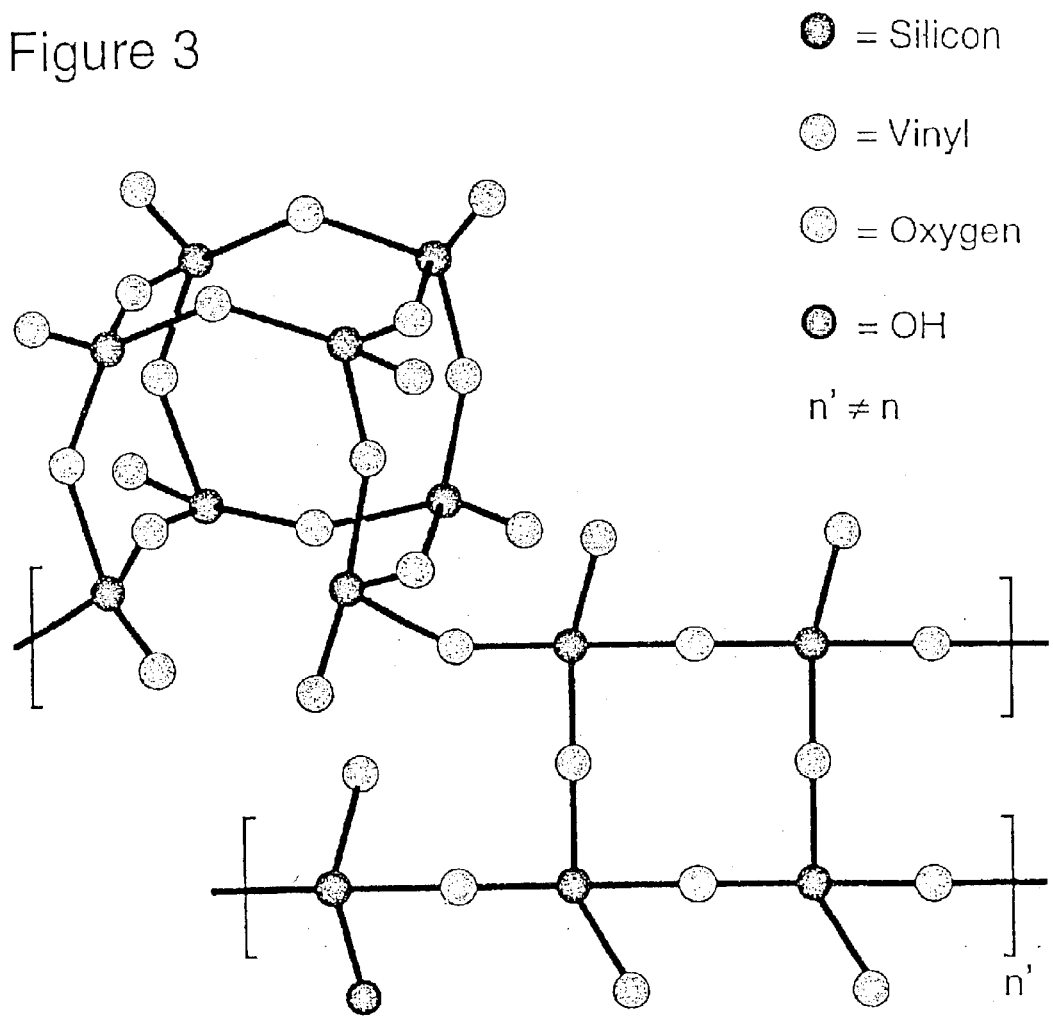
FIG. 3 illustrates a vinyl POSS polymer.

Although many methods of synthesis for the gas separator are possible, a silicon oxygen polymeric material generally described as a POSS material is preferred in one embodiment. FIGS. 1-3 illustrate a monomer, a prepolymer, and a polymeric form. Calculations have shown that of the POSS T8 (wherein "T#" refers to the number of tetrahedral silicon atoms in the cage), T10 and T12 cubes, the T12 cube.

The diameter of T8 is 15 Å, so it is a cube of face area of 225 Å$^2$. The enlargement to T12 makes a Roganite size face with an internal opening about 4 Å, but must be a cube somewhat larger than the T8. For simplicity, assume a 25×25×25 cube; and that they are located 3 to 5 Å apart, (2 carbons=4 Å and 4 carbons=8 Å).
(33 Å)$^2$=1089 Å$^2$
(4 Å/2 Å)$^2$π=12.6 Å$^2$ $$\frac{12.6 \; \mathring{A}^2}{1089 \; \mathring{A}^2} = 1.116\% \; openings$$

1 m$^2$=$10^{20}$ Å$^2$
therefore 1 m$^2$ has:
$10^{20}$ Å$^2 \times 1.16\%$=$1.16 \times 10^{18}$ holes.
1 atom/hole/$10^{-6}$ sec is $1.16 \times 10^{24}$ atoms/sec.

$$\frac{1.16 \times 10^{24}}{6.06 \times 10^{23}} = 1.9 \; mole/sec$$

If oxygen then: 1.9 mole/sec×32 g/mole×86,400 sec/day⇒
5,253,120×10$^2$ g/day
Or: 5.78 tons oxygen/day/m$^2$.

Figure 6:
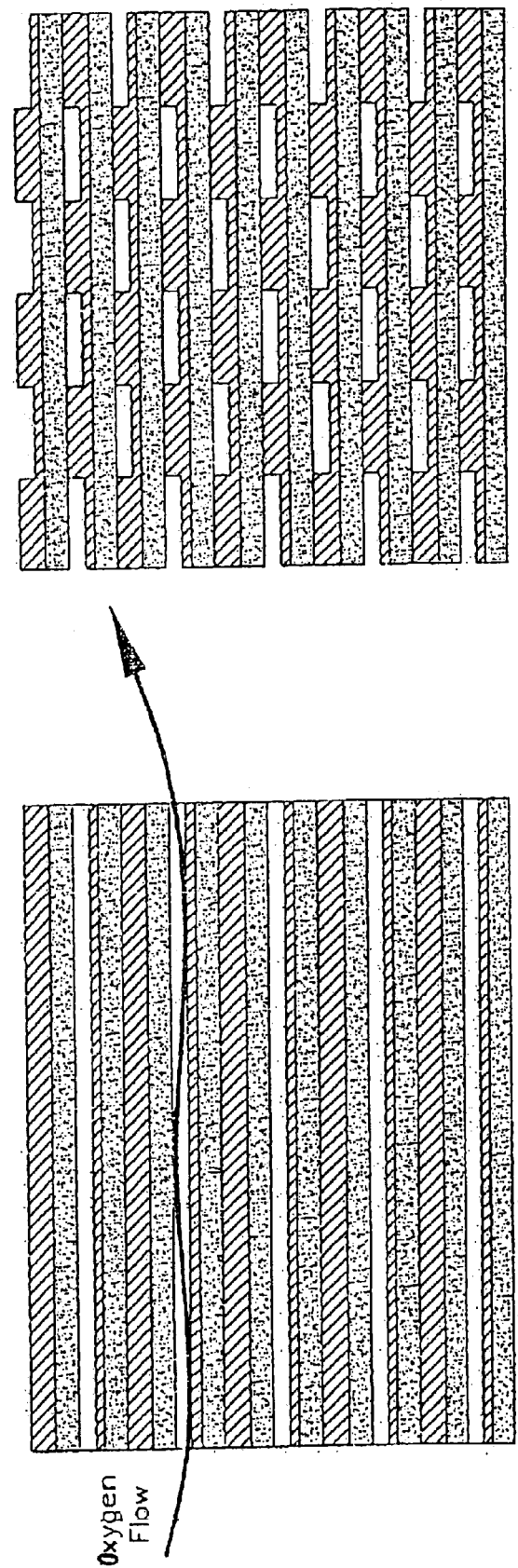
FIGS. 6 and 7 illustrate a stacked thin film containing channels.
Figure 7:
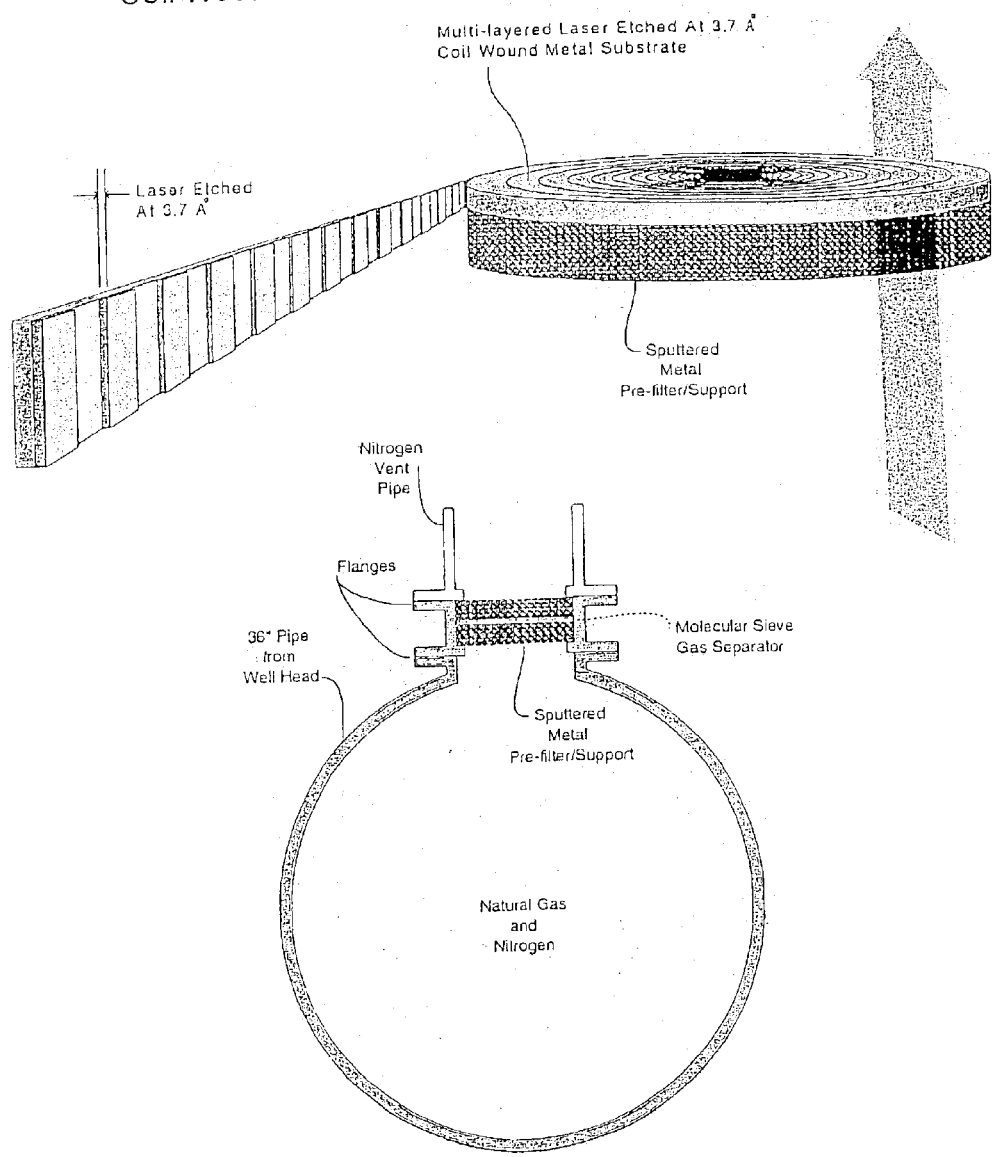

As an alternate method of variably selecting hole sizes in a true molecular sieve for separation of gases, the pores or holes may be formed by various micro-machining methods such as ablation, vapor deposition, etching by ions, chemical solutions, augmented by laser light, heat, or ultraviolet light, masked or unmasked, templating, inverse opal methods, or any system that allows uniform openings to be prepared. Initially, a thin film of aluminum or other metal could be sputtered onto a metal, ceramic, or organic substrate. The metal is chosen based upon the desired depth of sputtering and the lattice constant of the metal. For instance, if a sputter depth of 3.2 Å is desired, then it would be preferred to use a metal having a lattice constant of 3.2 Å. Typical metals which can be used are iron, copper, nickel, chromium, cobalt, gold, silver, titanium, silicon and lead. Then, by one of the methods mentioned above, the thin film would be removed in a specific pattern based on the use of a photoresist mask. The resist would then be removed, leaving tracks or channels in the thin film. It would not be necessary to control the widths of these tracks, so any micro-machining method could be used. The only critical dimension is depth, and this can be controlled by variables such as the etchant used or the time of exposure to the catalyst light. The depth of the tracks could also be controlled by the type of metal in the thin film, since different metals have different lattice constants, and the removal of a few atoms of one metal would create a track of a different depth than the removal of the same number of atoms of a different metal. The structure of the thin film containing tracks is shown in FIGS. 6 and 7.

Once the channels have been created in the metallic thin film, the structure could be cut into parallel pieces and assembled as a sandwich (FIG. 6), supported by a mechanical system so the assembly will allow the passage of gases. If necessary, the layers could be assembled by placing the thin metallic films in contact with each other, and removing the substrate by methods previously described. This approach would eliminate the thickness of the substrate from the final assembly, thereby resulting in a higher level of porosity. An alternate method of creating the porous structure would be to make a long thin film, and then roll the film as in FIG. 5.

Figure 8:
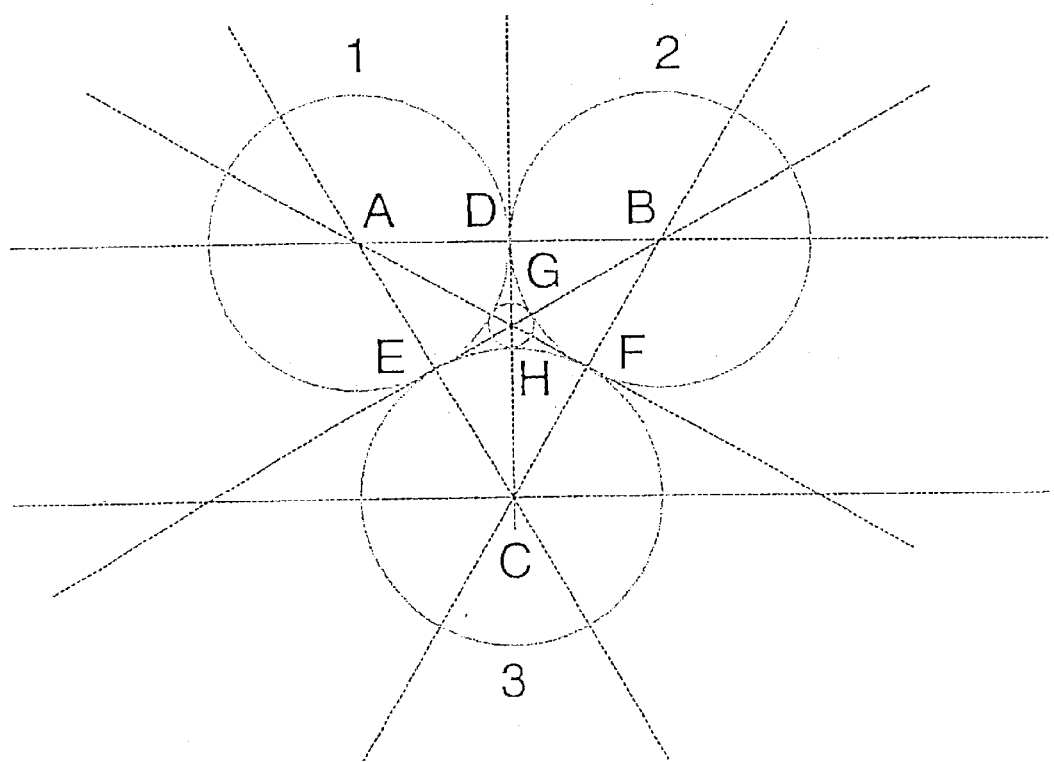
FIG. 8 illustrates close packed spheres.
Figure 9:
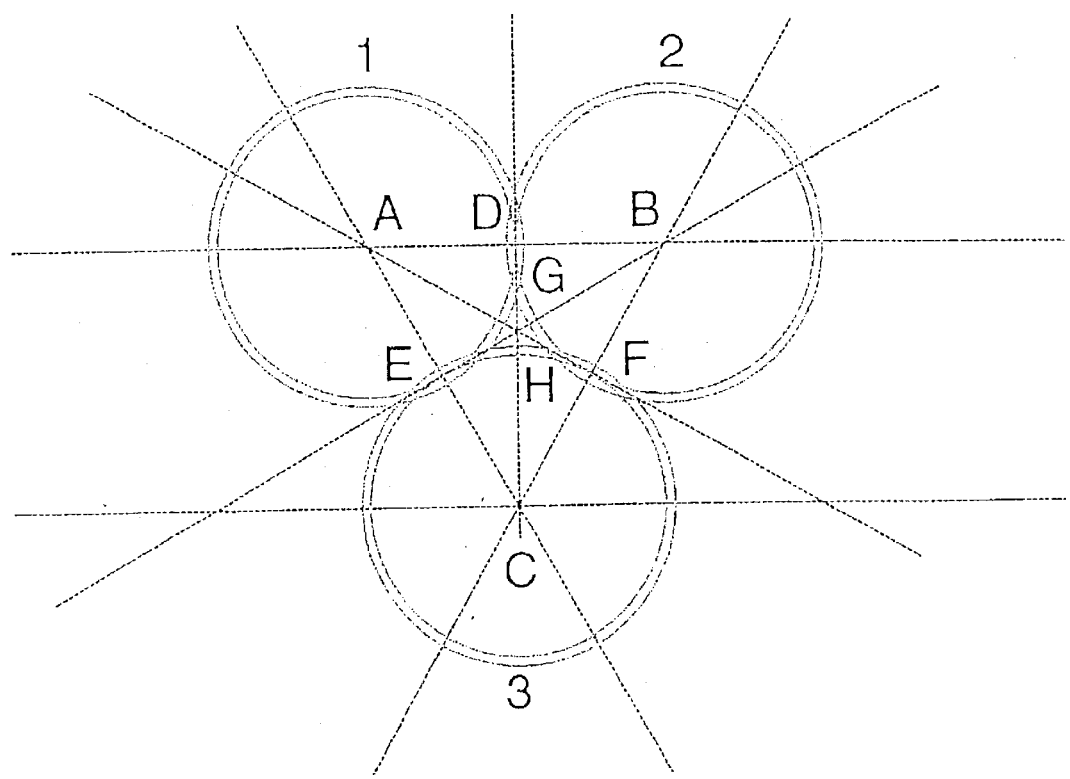
FIG. 9 illustrates deformed close packed spheres.

As a third method of selecting hole sizes in a true molecular sieve, very small spheres (microspheres) of a uniform and appropriate diameter can be pressed into a porous pellet. Close packing of spheres results in a pore volume of approximately 74%. However, the largest continuous pore diameter within a structure of close-packed spheres is 15.4% of the diameter of the spheres (FIG. 8). Thus, spheres of a diameter of 5 nm (50 Å) would press into a porous compact in which the maximum continuous pore size would be approximately 7.7 Å. If the spheres deformed during pressing, or as the result of other consolidation procedures such as sintering, even smaller pores would be created for a given size of sphere (FIG. 9). For example, it can be shown that at 8% deformation of the spheres, the pore size is reduced to approximately 6% of the original sphere diameter. Thus, the same 5-nm spheres would produce a structure with 3.12 Å.

In each of the following Examples, the values of weight percent (wt %) are measured as a percentage of the total weight of the mixture. The units of "m$\mu$" refer to $1 \times 10^{-6}$ meters.

EXAMPLE 2

A porous film is prepared by mixing 30 wt % of octa vinyl POSS with 68 wt % polydimethylsiloxane (a silicone film former) and curing with 2 wt % benzoyl peroxide at 60° C. for 1 hour. The combined mixture is coated on a 0.2 m$\mu$ stainless steel filter support.

EXAMPLE 3

A porous film for separating carbon dioxide and methane is prepared by mixing 40 wt % gamma-cyclodextrin-hydroxypropyl derivative with 60 wt % VixTx (POSS vinyl resin). This mixture is dissolved in denatured alcohol and cast into a film on a 0.2 m$\mu$ stainless steel support. No curing agent is required.

EXAMPLE 4

A porous film for separating methane and nitrogen is prepared by dissolving 50 wt % polyvinyl POSS (VixTx) resin and 50 wt % VnTn (POSS 8, 10 and 12 cages) in tetrahydrofuran and cast on a 0.2 m$\mu$ stainless steel support. No curing agent is required.

EXAMPLE 5

A porous film for separating air components from higher molecular hydrocarbons in recovery of propane, hexanes, pentanes, and/or butanes from waste streams is prepared by dispersing 50% by weight polyvinyl POSS (VixTx) resin and 50 wt % dodecyl phenyl $T_{12}$ in tetrahydrofuran and coating the dispersion on a 0.2 m$\mu$ stainless steel filter support. No curing agent is required.

EXAMPLE 6

A porous film for oxygen enhancement (the degree of which is related to the POSS concentration) prepared by mixing 50% by weight methyl methacrylate, 48 wt % vinyl POSS cages ($T_8$ (VnTn POSS), $T_{10}$, $T_{12}$), and 2 wt % curing agent are made into a film on a 0.2 m$\mu$ stainless steel support.

EXAMPLE 7

A porous film for separating gases prepared by mixing 20% by weight of poly(vinylsilsesquioxane), 40% 1,3,5,7, 9,11,13,15-octavinylpentacyclo[9.5.1.13,9.15,-15.17,13] octasiloxane (octavinyl POSS), and 38% dimethylsiloxane in tetrahydrofuran, adding 2% benzoyl peroxide. The mixture is coated on a 0.2 m$\mu$ stainless steel filter support.

EXAMPLE 8

A porous film for separating gases prepared by mixing 54% by weight styrene, 4 wt % divinylbenzene, 40 wt % 1,3,5,7,9,11,13,15-octavinylpentacyclo[9.5.1.13,9.15,-15.17,13]octa-siloxane (octavinyl POSS), and in tetrahydrofuran, then adding 2 wt % benzoyl peroxide. The mixture is coated on a 0.2 m$\mu$ stainless steel filter support.

EXAMPLE 9

A porous film for separating gases prepared by separately forming two mixtures: in a reaction flask, 40 wt % 1,3,5,7, 9,11,13,15-octavinylpentacyclo[9.5.1.13,9.15,-15.17,13] octa-siloxane (octavinyl POSS) is combined with tetrahydrofuran, followed by adding 2 wt % benzoyl peroxide; and in a second reaction flask, 54% by weight styrene and 4 wt % divinylbenzene are combined with tetrahydrofuran. The two mixtures are then combined in a single flask. The combined mixture is coated on a 0.2 m$\mu$ stainless steel filter support.

What is claimed is:

1. A method of separating a mixture of N (N≧2) gases by size exclusion, comprising:
    contacting the mixture of gases with N−1 gas permeable porous films, each of the N−1 gas permeable porous films being made of a permeable porous material including pores of different sizes, formed with at least one nanostructured compound, wherein the at least one nanostructured compound includes 30% or more polyhedral oligomeric silsequioxane (POSS) by weight; wherein at least one of the N−1 gas permeable porous films has pores which do not allow permeation of at least one of the N gases.

2. A method of separating a mixture of N (N≧2) gases by size exclusion, comprising:
    contacting the mixture of gases with N−1 gas permeable porous films, each of the N−1 gas permeable porous films being made of a permeable porous material including at least one nanostructured compound having naturally occurring pores wherein the naturally occurring pores contribute to the gas separation by selectable pore size exclusion and/or creates pores by disturbing surrounding structure wherein the created pores contribute to the gas separation by selectable pore size exclusion.

3. A method of separating a mixture of N (N≧2) gases by size exclusion, comprising:
    contacting the mixture of gases with N−1 gas permeable porous films, each of the N−1 gas permeable porous films being made of a permeable porous material including pores formed with at least one nanostructured compound, wherein the at least one nanostructure compound is a polyhedral oligomeric silsequioxane (POSS) selected from the group consisting of:
    1-[3-(allylbisphenol A)propyldimethylsiloxy]-3,5,7,9,11, 13,15heptacyclopentylpentacyclo-[9.5.1.13,9.15, 15.17,13]octasiloxane;
    1-[3-(allylbiphenol)propyldimethylsiloxy]-3,5,7,9,11,13, 15heptacyclopentylpentacyclo-[9.5.1.13,9.15,15.17, 13]octasiloxane;
    1-[3-(1,3-propanediol-2-ethyl-2-methytloxy) prpyldimethylsiloxy]-3,5,7,9,11,13,15-heptacyclopentylpentacyclo-[9.5.1.13,9.15,15.17,13] octasiloxane;

1-[(2-methyl,2-hydroxy)butyldimethylsiloxy]-3,5,7,9,11, 13,15-heptacyclopentylpentacyclo-[9.5.1.1$^{3,9}$.1$^{5,15}$,1$^{7,}$ $_{13}$]octasiloxane;

1-[3-(ethoxydimethylsilyl)propyl]3,5,7,9,11,13,15-heptacyclopentylpentacyclo[9.5.1.1$^{3,9}$,1$^{15,15}$,1$^{7,13}$] octasiloxane;

1-[2-(diethoxymethylsilyl)propyl]3,5,7,9,11,13,15-heptacyclopentylpentacyclo[9.5.1.1$^{3,9}$,1$^{15,15}$,1$^{7,13}$] octasiloxane:

1-[3-(triethoxysilyl)propyl]3,5,7,9,11,13,15-heptacyclopentylpentacyclo[9.5.1.1$^{3,9}$,1$^{15,15}$,1$^{7,13}$] octasiloxane;

1-[2-(ethoxydimethylsilyl)ethyl]3,5,7,9,11,13,15-heptacyclopentylpentacyclo[9.5.1.1$^{3,9}$,1$^{15,15}$,1$^{7,13}$] octasiloxane;

1-[2-(diethoxymethylsilyl)propy]3,5,7,9,11,13,15-heptacyclopentylpentacyclo[9.5.1.1$^{3,9}$,1$^{15,15}$,1$^{7,13}$] octasiloxane;

1-[2-(triethoxysilyl)propyl]3,5,7,9,11,13,15-heptacyclopentylpentacyclo[9.5.1.1$^{3,9}$,1$^{15,15}$,1$^{7,13}$] octasiloxane;

POSS-BisPhenol A-urethanes;

POSS-DiMethylol-urethanes;

1-chloro-3,5,7,9,11,13,15-heptacyclopentylpentacyclo [9.5.1.13,9.15,15.17,13]octasiloxane;

1-[2-(chlorodimethylsilyl)ethyl]-3,5,7,9,11,13, 15heptacyclopentylpentacyclol[9.5.1.13,9.15,15.17, 13]octasiloxane;

1-[2-(dichloromethylsilyl)ethyl]-3,5,7,9,11,13, 15heptacyclopentylpentacyclo[9.5.1.13,9.15,15.17,13] octasiloxane;

1-[2-(trichlorosilyl)ethyl]-3,5,7,9,11,13,15-heptacyclopentylpentacyclo[9.5.1.13,9.15,15.17,13] octasiloxane;

1-[3-(chlorodimethylsilyl)propyl]-3,5,7,9,11,13,15-heptacyclopentylpentacyclo[9.5.1.13,9.15,15.17,13)-octasiloxane;

1-[3-(dichloromethylsilyl)propyl]-3,5,7,9,11,13,15-heptacyclopentylpentacyolo[9.5.1.13,9.15,15.17,13]-octasiloxane;

1-[3-(trichlorosilyl)propyl[3,5,7,9,11,13,15-heptacyclopentylpentacyclo[9.5.1.13,9.15,15.17,13] octasiloxane;

1,3,5,7,9,11,13,15-[2-(chlorodimethylsilyl)ethyl] pentacyclo[9.5.1.1$^{3,9}$.1$^{5,15}$,1$^{7,13}$]octasiloxane;

1,3,5,7,9,11,13,15-[2-(chlorodimethylsilyl)ethyl] pentacyclo[9.5.1.1$^{3,9}$.1$^{5,15}$.1$^{7,13}$]octasiloxane;

1,3,5,7,9,11,13,15-[2-(dichlorodimethylsilyl)ethyl] pentacyclo[9.5.1.1$^{3,9}$.1$^{5,15}$.1$^{7,13}$]octasiloxane;

1-[(2-epoxy)propyl]-3,5,7,9,11,13,15-heptacyclopentylpentacyclo[9.5.1.13,9.15,15.17,13] octasiloxane;

1-[2-(cyclohexyl-3-epoxy)ethyl]-3,5,7,9,11,13,15-heptacyclopentylpentacyclo[9.5.1.13,9.15,15.17,13]-octasiloxane;

POSS-diepoxide resins; 1,3,5,7,9-octavinyl-11,13,15-epoxyethylpentacyclo[9.5.1.1.$^{3,9}$.1.$^{15,15}$.1.$^{17,13}$] octasiloxane;

endo-3,7,14-tris[1-(3-dimethylsiloxy)propyloxy-2,3-epoxypropyl]-1,3,5,7,9,11,14,-heptacyclopentyltricyclo[7.3.3.1,$^{5,11}$-heptasiloxane;

1-(methylpropionato)-3,5,7,9,11,13,15-heptacyclopentylpentacyclo [9.5.1.1$^{3,9}$.1$^{5,15}$.1$^{7,13}$] octasiloxane;

1-(ethylundecanoato)-3,5,7,9,11,13,15-heptacyclopentylpentacyclo[9.5.1.1$^{3,9}$.1$^{5,15}$.1$^{7,13}$] octasiloxane;

1-[(3-chloro)propyl]-3,5,7,9,11,13,15-heptacyclopentytpentacyclo[9.5.1.13,9.15,15.17,13] octasiloxane;

1-[4-chlorophenyl]-3,5,7,9,11,13,15-heptacyclopentylpentacyclo[9.5.1.13,9.15,15.17,13] octasiloxane;

1-[chlorobenzyl]-3,5,7,9,11,13,15-heptacyclopentylpentacyclo[9.5.1.13,9.15,15.17,13] octasiloxane;

1-[2-(chlorobenzyl)ethyl]-3,5,7,9,11,13,15-heptacyclopentylpentacyclo[9.5.1.13,9.15,15.17,13] octasiloxane;

1-[3-(methacryl)propyl]-3,5,7,9,11,13,15-heptacyclopentylpentacyclo[9.5.1.13,9.15,15.17,13] octasiloxane;

1-[3-(methacryl)propyldimethylsiloxy]-3,5,7,9,11,13,15-heptacyclopentylpentaoyclo[9.5.1.13,9.15,15.17,13]-octasiloxane;

1-(3,3,3-trifluoropropyldimethylsiloxy)-1,3,5,9,11,13,15-heptacyclopentyl-7-[3-(methacryl)propyl]-7-methyltetracyclo[9.5.1.1$^{5,11}$.1$^{9,15}$]octasiloxane;

1-(tridecafluoro-1,1,2,2-tetrahydrooctyldimethylsiloxy)-1,3,5,9,11,13,15-heptacyclopentyl-7-[3-(methacryl) propyl]-7-methyltetracyclo[9.5.1.1$^{5,11}$.1$^{9,15}$] octasiloxane;

1-(trimethylsiloxy)-1,3,5,9,11,13,15-heptacyclopentyl-7-[3-(methacryl)propyl]-7-methyltetracyclo[9.5.1. 1$^{5,11}$.1$^{9,15}$]octasiloxane;

1,3,5,7,9-pentavinyl-11,13,15-[1-hydroxy-2-(methacryl) ethyl]pentacyclo[9.5.1.1$^{3,9}$.1$^{5,15}$.1$^{7,13}$]octasiloxane;

1,3,5,7,9,11-hexacyclohexyltetracyclo]5.5.1.13,11.15,9] hexasiloxane;

1,3,5,7,9,11,13,15-octacyclohexylpentacyclo[9.5.1.13, 9.15,15.17,13]octasiloxane;

1,3,5,7,9,11,13,15-octacyclopentylpentacyclo[9.5.1.13, 9.15,15.17,13]octasiloxane;

1,3,5,7,9,11,13,15-octaphenylpentacyclo[9.5.1.1$^{3,9}$.1$^{5,15}$. 1$^{7,13}$]octasiloxane;

1,3,5,7,9,11,13,15-octamethylpentacyclo[9.5.1.1$^{3,9}$.1$^{5,15}$. 1$^{7,13}$]octasiloxane;

1,3,5,7,9,11,13,15-octakis(dimethylsilyloxy)pentacyclo [9.5.1.1$^{3,9}$.1$^{5,15}$.1$^{7,13}$]octasiloxane;

POSS-modified Nylon 6;

1-[(3-cyano)propyl]-3,5,7,9,11,13,15-heptacyclopentylpentacyclo[9.5.1.1$^{3,9}$.1$^{5,15}$.1$^{7,13}$] octasiloxane;

1-[2-(Norbornen-2-yl)ethyl]-3,5,7,9,11,13,15-heptacyclopentylpentacyclo[9.5.1.13,9.15,15.17,13] octasiloxane;

1-[2-(Norbornen-2-yl)ethyldimethylsiloxy]-3,5,7,9,11, 13,15heptacyclopentylpentacyclo[9.5.1.13,9.15,15.17, 13]-octasiloxane;

Poly(ethylnorbornenylPOSS-co-norbornene);

1,1,3,3-(Norbornenyldimethylsiloxy)-1,3,-dicyclohexyldisiloxane;

1-[3-(allylbisphenol A)propyldimethylsiloxy]-3,5,7,9,11, 13,15heptacyclopentylpentacyclo-[9.5.1.13,9.15, 15.17,13]octasiloxane;

1-(3-(allylbiphenol)propyldimethylsiloxy]-3,5,7,9,11,13, 15heptacyclopentylpentacyclo-[9.5.1.13,9.15,15.17, 13]octasiloxane;

1,3,5,7,9,11,13,15-octavinylpentacyclo[9.5.1.13,9.15, 15.17,13]octasiloxane;

1-vinyl-3,5,7,9,11,13,15-heptacyclopentylpentacyclo[9.5.1.13,9.15,15.17,13]octasiloxane;

1-allyl-3,5,7,9,11,13,15-heptacyclopentylpentacyclo[9.5.1.13,9.15,15.17,13]octasiloxane;

1-[2-(cyclohexen-3-yl)ethyl]-3,5,7,9,11,13,15-heptacyclopentylpentacyclo[9.5.1.13,9.15,15.17,13]octasiloxane;

Poly(dimethyl-co-methylvinyl-co-methylethylsiloxyPOSS)siloxane;

POSS-diepoxide resins;

POSS-BisPhenol A-urethanes;

1-[2(diphenylphosphino)ethyl]3,5,7,9,11,13,15-heptacyclopentylpentacyclo[9.5.1.1$^{3,9}$.1$^{5,15}$.1$^{7,13}$]octasiloxane;

1-[2(diphenylphosphino)propyl]3,5,7,9,11,13,15-heptacyclopentylpentacyclo[9.5.1.1$^{3,9}$.1$^{5,15}$.1$^{7,13}$]octasiloxane;

1-hydrido-3,5,7,9,11,13,15-heptacyclopentylpentacyclo[9.5.1.13,9.15,15.17,13]octasiloxane;

1-[hydridodimethylsiloxy]-3,5,7,9,11,13,15-heptacyclopentylpentacyclo[9.5.1.13,9.15,15.17,13]octasiloxane;

endo-3,7,14-tri(dimethylsilylhydrido)-1,3,5,7,9,11,14-heptacyclopentyltricyclo[7.3.3.15,11 ]heptasiloxane;

1,1,3,3-(hydridodimethylsiloxy)-1,3-dicyclohexyldisiloxane;

Poly(dimethyl-co-methylhydrido-co-methylpropylPOSS)siloxane;

endo-3,7,14-trihydroxy-1,3,5,7,9,11,14-heptacyclopentyltricyclo[7.3.3.15,11 ]heptasiloxane;

endo-3,7,14-trihydroxy-1,3,5,7,9,11,14-heptacyclohexyltricyclo[7.3.3.15,11]heptasiloxane;

1-hydroxy-3,5,7,9,11,13,15-heptacyclopentylpentacyclo[9.5.1.13,9.15,15.17,13]octasiloxane;

1,1,3,3-(tetrahydroxy)-1,3-dicyclohexyldisiloxane;

1,3,5,7-(tetrahydroxy)-1,3,5,7-(tetraphenyl)cyclotetrasiloxane;

endo-7,14-dihydroxy-3-(3,3,3-trifluoropropyldimethylsiloxy)-1,3,5,9,11,13,15-heptacyclopentyltricyclo[7.3.3.1$^{5,11}$]octasiloxane;

endo-7,14-dihydroxy-3-(3,3,3-trifluoropropyldimethylsiloxy)-1.3,5,9,11,13,15-heptacyclopentyltricyclo[7.3.3.1$^{5,11}$]octasiloxane;

1-[2-(styryl)ethyldimethylsiloxy]-3,5,7,9,11,13,15-heptacyclopentylpentacyclo[9.5.1.13,9.15,15.17,13]-octasiloxane;

1-[(4-vinyl)phenyl]-3,5,7,9,11,13,15-heptacyctopentylpentacyclo[9.5.1.13,9.15,15.17,13]octasiloxane;

1-[2-(styryl)ethyl]-3,5,7,9,11,13,15-heptacyclopentylpentacyclo[9.5.1.13,9.15,15.17,13]-octasiloxane;

Poly(styrylPOSS-co-styrene);

poly(vinylsilsesquioxane); T10 compound, T12 compound, T14 compound, and mixtures thereof.

* * * * *